(12) United States Patent
Plaisted et al.

(10) Patent No.: US 8,816,870 B2
(45) Date of Patent: Aug. 26, 2014

(54) HEALTHY HOME GRAPHICAL USER INTERFACE METHOD AND DEVICE

(75) Inventors: Joshua Reed Plaisted, Oakland, CA (US); Gordon Michael Handelsman, Thousand Oaks, CA (US)

(73) Assignee: PVT Solar, Inc., Fremont, CA (US)

( * ) Notice: Subject to any disclaimer, the term of this patent is extended or adjusted under 35 U.S.C. 154(b) by 920 days.

(21) Appl. No.: 12/750,631

(22) Filed: Mar. 30, 2010

(65) Prior Publication Data

US 2010/0245103 A1    Sep. 30, 2010

Related U.S. Application Data

(60) Provisional application No. 61/165,469, filed on Mar. 31, 2009.

(51) Int. Cl.
G08B 21/00 (2006.01)
G08B 23/00 (2006.01)
G08C 15/06 (2006.01)
G08B 19/00 (2006.01)
G06F 7/00 (2006.01)
G06F 15/00 (2006.01)
G06F 17/00 (2006.01)

(52) U.S. Cl.
USPC ............... 340/657; 340/870.02; 340/870.04; 340/870.09; 707/805; 702/188; 705/412

(58) Field of Classification Search
CPC ............... H02J 5/00; H02J 9/00; H02J 13/00; H02J 17/00; H02J 2003/00; H02J 2009/00; H02J 4/00; H02J 9/002; H02J 9/06; H02J 13/0096; H02J 2003/001; H02J 2003/003; H02J 2003/14; H02J 2009/007; H02J 2009/04; H02J 2009/06; H02J 2009/068; H02J 1/00; H02J 2003/12; H02J 2003/143; H02J 2001/00; Y02E 40/00; Y02E 40/70; Y02E 40/72; Y02E 40/76; Y02E 10/10; Y04S 10/00; Y04S 10/10; Y04S 10/40; Y04S 10/50; Y04S 20/00; Y04S 30/00; Y04S 40/00; Y04S 50/00; Y04S 40/10; Y04S 40/14; Y04S 40/16; Y04S 50/10; Y04S 50/12; Y04S 50/14; Y04S 10/52
USPC ............... 340/657, 870.17, 870.16, 605, 3.1, 340/870.4; 715/200, 236, 700, 243, 273, 715/797, 810; 705/7, 10, 7.11, 7.22, 7.29, 705/7.32, 14.12; 700/19, 9, 17, 20, 28, 73, 700/83
See application file for complete search history.

(56) References Cited

U.S. PATENT DOCUMENTS 6,002,398 A * 12/1999 Wilson ......................... 715/777
6,985,779 B2    1/2006 Hsiung et al.
(Continued)

OTHER PUBLICATIONS

PCT Search Report for patent application PCT/US2010/029506 (Jun. 1, 2010).

*Primary Examiner* — Jennifer Mehmood
*Assistant Examiner* — Mirza Alam
(74) *Attorney, Agent, or Firm* — Armstrong Teasdale LLP

(57) ABSTRACT

A user display for a healthy home or like building structure. The user display includes a hardware housing and a display device coupled to the hardware housing. The user display further includes a plurality of graphical objects corresponding respectively to a plurality of different loads numbered from a through N, where N is an integer greater than 1. The loads can include, among others, air conditioning, water, heat, electricity, swimming pool, and others. Each of the graphical objects is displayed in a common unit of measurement and comprises a total demand portion and a fraction of renewable energy portion.

22 Claims, 29 Drawing Sheets

(56) References Cited

U.S. PATENT DOCUMENTS

| | | | |
|---|---|---|---|
| 2002/0016639 A1* | 2/2002 | Smith et al. | 700/9 |
| 2003/0233201 A1 | 12/2003 | Horst et al. | |
| 2004/0117330 A1* | 6/2004 | Ehlers et al. | 705/412 |
| 2006/0085167 A1* | 4/2006 | Warfield et al. | 702/188 |
| 2006/0106741 A1* | 5/2006 | Janarthanan | 705/412 |
| 2006/0161450 A1* | 7/2006 | Carey et al. | 705/1 |
| 2007/0043477 A1* | 2/2007 | Ehlers et al. | 700/276 |
| 2008/0306985 A1* | 12/2008 | Murray et al. | 707/102 |
| 2009/0088991 A1* | 4/2009 | Brzezowski et al. | 702/62 |
| 2009/0109056 A1* | 4/2009 | Tamarkin et al. | 340/870.02 |
| 2010/0060479 A1* | 3/2010 | Salter | 340/870.4 |

\* cited by examiner

New GuI measures and displays all energy flows in a common Energy Unit

HEALTHY HOME GRAPHICAL USER INTERFACE METHOD AND DEVICE

CROSS-REFERENCES TO RELATED APPLICATIONS

This application claims priority to U.S. Provisional Patent Application No. 61/165,469, filed Mar. 31, 2009, commonly owned and incorporated by reference in its entirety for all purposes.

STATEMENT AS TO RIGHTS TO INVENTIONS MADE UNDER FEDERALLY SPONSORED RESEARCH AND DEVELOPMENT

Not applicable

REFERENCE TO A "SEQUENCE LISTING," A TABLE, OR A COMPUTER PROGRAM LISTING APPENDIX SUBMITTED ON A COMPACT DISK

Not applicable

BACKGROUND OF THE INVENTION

The present invention relates to operation of a solar system. More particularly, the present invention provides a method and device for monitoring a solar system through a controller, and displaying information in text, graphical, and, optionally, animation form. Merely, by way of example, the present invention has been applied to a solar module configured on a building structure, but it would be recognized that the invention has a much broader range of applications such as other photovoltaic solar modules and combinations.

Over past centuries, the world population of human beings has exploded. Along with the population, demand for resources has also grown explosively. Such resources include raw materials such as wood, iron, and copper and energy, such as fossil fuels, including coal and oil. Industrial countries worldwide project more increases in oil consumption for transportation and heating purposes from developing nations such as China and India. Obviously, our daily lives depend, for the most part, upon oil or other forms of fossil fuel, which is becoming scarce as it becomes depleted.

Along with the depletion of our fossil fuel resources, our planet has experienced a global warming phenomena, known as "global warming," which was brought to our foremost attention by our Al Gore, who is the former Vice President of the United States of America. Global warming is known as an increase in an average temperature of the Earth's air near its surface, which is projected to continue to increase at a rapid pace. Warming is believed to be caused by greenhouse cases, which are derived, in part, from use of fossil fuels. The increase in temperature is expected to cause a rise in temperature, extreme weather conditions, and higher sea levels. Ultimately, other effects include mass species extinctions, and possibly other uncertainties that may be detrimental to human beings.

Much if not all of the useful energy found on the Earth comes from our sun. Generally all common plant life on the Earth achieves life using photosynthesis processes from sun light. Fossil fuels such as oil were also developed from biological materials derived from energy associated with the sun. For most living beings on the Earth, sunlight has been essential. Likewise, the sun has been our most important energy source and fuel for modern day solar energy. Solar energy possesses many characteristics that are very desirable! Solar energy is renewable, clean, abundant, and often widespread.

As an example, solar panels have been developed to convert sunlight into energy. As merely an example, solar thermal panels often convert electromagnetic radiation from the sun into thermal energy for heating homes, running certain industrial processes, or driving high grade turbines to generate electricity. As another example, solar photovoltaic panels convert sunlight directly into electricity for a variety of applications. Solar panels are generally composed of an array of solar cells, which are interconnected to each other. The cells are often arranged in series and/or parallel groups of cells in series. Accordingly, solar panels have great potential to benefit our nation, security, and human users. They can even diversify our energy requirements and reduce the world's dependence on oil and other potentially detrimental sources of energy.

Although solar panels have been used successful for certain applications, there are still certain limitations. Solar cells are often costly. Depending upon the geographic region, there are often financial subsidies from governmental entities for purchasing solar panels, which often cannot compete with the direct purchase of electricity from public power companies. Additionally, the panels are often composed of silicon bearing wafer materials. Such wafer materials are often costly and difficult to manufacture efficiently on a large scale. Availability of solar panels is also somewhat scarce. That is, solar panels are often difficult to find and purchase from limited sources of photovoltaic silicon bearing materials. These and other limitations are described throughout the present specification, and may be described in more detail below.

From the above, it is seen that techniques for improving operation of a solar system are highly desired.

BRIEF SUMMARY OF THE INVENTION

According to the present invention, a technique for monitoring the operation of a healthy home is provided. More particularly, the present invention provides a method and device for monitoring a solar system through a controller, and displaying information in text, graphical, and, optionally, animation form. Merely, by way of example, the present invention has been applied to a solar module configured on a building structure, but it would be recognized that the invention has a much broader range of applications.

In a specific embodiment, the present invention provides a user display for a healthy home or like building structure. In a specific embodiment, the display includes a hardware housing and a display device coupled to the hardware housing. The display includes a plurality of graphical objects corresponding respectively to a plurality of different loads numbered from a through N, where N is an integer greater than 1. As an example, the loads can include, among others, air conditioning, water, heat, electricity, swimming pool, and others. In a specific embodiment, each of the graphical objects is displayed in a common unit of measurement. In a specific embodiment, each of the graphical objects comprises a total demand portion and a fraction of renewable energy portion. Of course, there can be other variations, modifications, and alternatives.

In a specific embodiment, the present invention provides a graphical user interface, which monitors energy usage, and related systems and methods. In one or more embodiments, the present invention has one or more of the following features:

Both electrical and thermal energy production are metered;

Relay performance through local interfaces to one or more enterprise servers for permanent storage in a database;

Thermal metering is done with precision sensors that meter energy delivered for both water heating and space heating;

Metering accuracy is within 95% accuracy;

Measure thermal power every 30-seconds or other time period on the system and roll that up into 15-minute energy production values;

Energy offset is calculated based on the energy produced, the fuel used by the backup device, and the efficiency of the back-up device;

As an example, upon installation, the present method records make & model of backup heating systems (water heater & furnace) which lead to efficiency of the device (i.e., independent $3^{rd}$ party efficiency ratings from GAMA/ARI, all equipment carries these national ratings). Such national ratings actually result in a conservative estimate for the consumer because it represents new equipment perfectly installed—existing equipment never works that efficiently.

In a specific embodiment, the conversion efficiency converts energy production to an energy offset of the base fuel or energy, e.g., natural gas, propane, electricity, or others. As an example, the present method provides a cost per kWh, a cost for natural gas measured as $/therm, and others.

The above process is totally transparent, auditable, and uses $3^{rd}$ party nationally accepted stands on unit efficiency.

Still further, the present invention provides a method for outputting information in a common unit in graphical form on one or more display devices. The method includes determining at least one thermal load from a plurality of loads provided in a home or building structure. The one thermal load being measured in a unit consisting of therms according to one or more embodiments. The method includes determining an energy production in the unit consisting of therms from a renewable energy source at the thermal load according to a specific embodiment. The method also includes outputting a first graphical object illustrating a total energy use of the thermal load on a first portion of the display, outputting a second graphical object illustrating a renewable energy source portion of the thermal load on a second portion of the display, and outputting a third graphical object illustrating a public utility source portion of the thermal load on a third portion of the display. As used herein and other parts of the present specification, the term "object" can refer to any graphical user interface and/or text or any combination of visual elements and is ordinary understood by its literal meaning.

In still a further embodiment, the present invention provides a method for displaying energy usage from multiple loads and different sources. The method includes receiving first load information from a first load in a first unit and receiving second load information from a second load in a second unit. The method includes processing the first load information and the second load information into a common unit measure. In a specific embodiment, the method includes outputting a first graphical indication of energy usage of the first load in the common unit and outputting a second graphical indication of energy usage of the second load in the common unit.

Moreover, the present invention provides a device for displaying energy usage from multiple loads and multiple sources in a common energy unit comprising: outputting in a display format one or more indications associated with a first load in a first unit, a second load in a second unit, and a first source in a third unit. Of course, there can be other variations, modifications and alternatives.

Many benefits are achieved by way of the present invention over conventional techniques. Providing the user with accurate and reliable information regarding the operation of his/her healthy home system is beneficial, not only from the vantage of keeping the user well-informed and operating parameter modifications to be done. In a preferred embodiment, the present solar system can be monitored for failure, reliability, and/or other working disorders, and the like by way of easy to read user interfaces using common units of measurement. In a specific embodiment, the solar module system and operation can be configured using computer software from a controller or other processing device. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques related to operation of a solar system are provided. More particularly, the present invention provides a method and device for operating a solar thermal system through a controller, and displaying information in text, graphical, and animation form. Merely, by way of example, the present invention has been applied to a thermal solar module configured on a building structure, but it would be recognized that the invention has a much broader range of applications.

Figure 1:
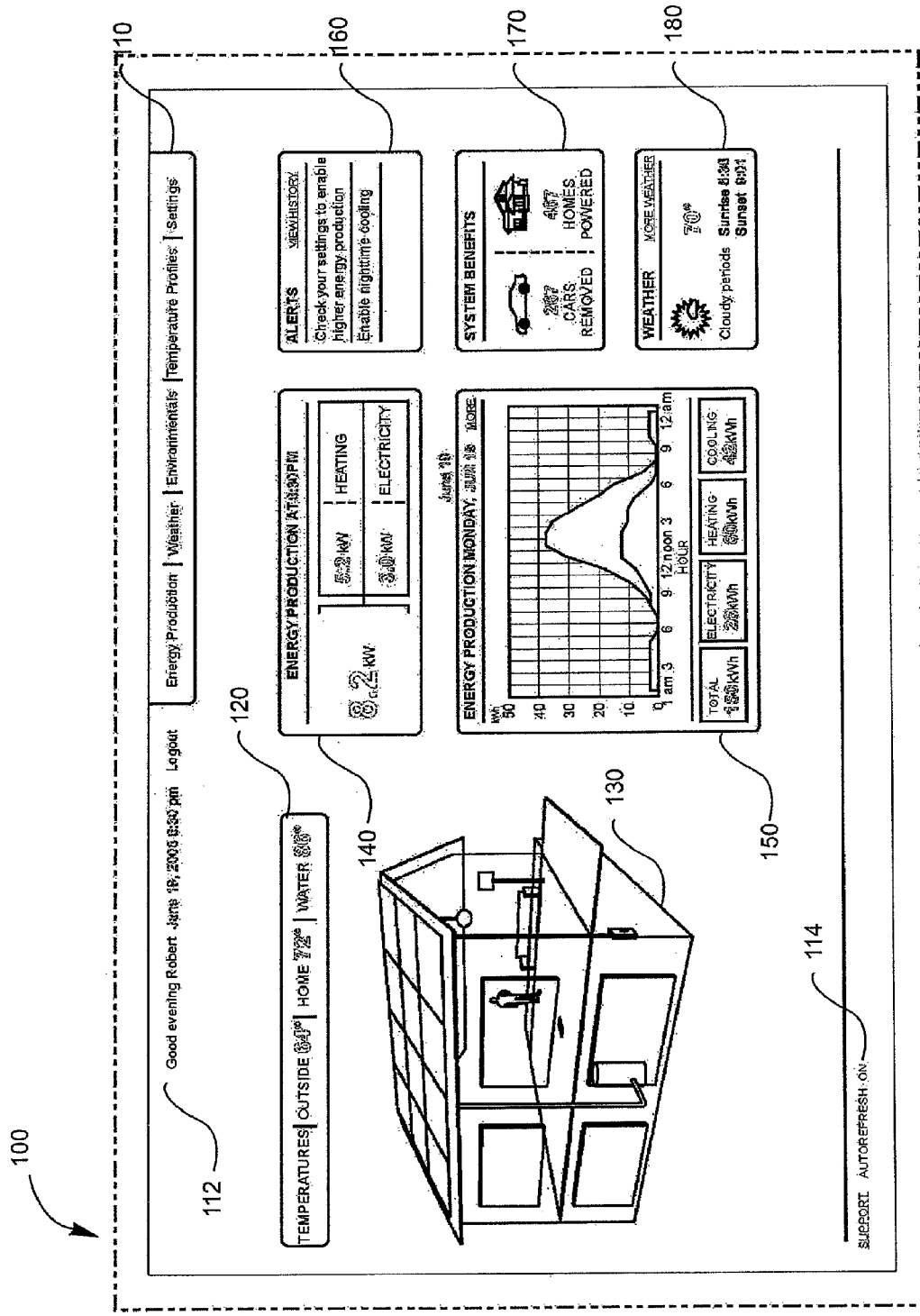
FIG. 1 is a simplified diagram of a user interface for a display of a healthy home according to an embodiment of the present invention.

FIG. 1 is a simplified diagram of a user interface for a display of a healthy home according to an embodiment of the present invention. These diagrams are merely illustrations and should not limit the scope of the claims herein. One of ordinary skill in the art would recognize other variations, modifications, and alternatives. As shown, the graphical user interface 100 is one of many, if not the first, window for the solar thermal operation monitoring system. The user interface 100 includes a variety of features such as a tool bar 110 that has at least features directed to Energy Production, Weather, Environmentals, Temperature Profiles, and Settings prompts. The user interface also includes an additional user control fields 112 and 114 that has at least features directed to a user greeting message, a date and time display, and Auto-Refresh, Logoff, & Support prompts.

Additionally, the interface includes a temperature display panel 120, a graphical illustration 130 of a solar array coupled to a building structure, a current energy production display panel 140, an cumulative energy production history diagram display panel 150, an alerts/notifications display panel 160, a system benefits display panel 170, and a weather display panel 180. As shown, each of the elements described herein can include navigation features that can be accessed by way of a mouse cursor positioned over a respective icon or link which allows entry. Of course, there can be other variations, modifications, and alternatives.

The present invention allows for easy viewing, monitoring, and control of the operation of a solar thermal system implemented at a target location. Once a user has initialized a computing system with the program code to launch the user interface, the user can immediately determine the status of his/her healthy home system. The temperature display panel 120 allows the user to determine indoor, outdoor, and water heater temperature easily and clearly. The graphical illustration 130 of the solar array coupled to the user's target building location allows the user to quickly determine the operative status of his/her healthy home system's solar panel, electric panel, indoor heating, and water heating systems. Working status of these systems is clearly displayed by use of color-coded animations to indicate whether a particular system is functional or requires attention. The use of easily recognizable animations and clear display of subsequent temperatures maintained in the healthy home provides ease and accessibility to virtually every average user. One skilled in the art would recognize other variations, modifications, and alternatives.

The current energy production display panel 140 and the cumulative energy production history diagram display panel 150 provides the user with general information related to thermal and electrical energy production of the healthy home system. In a specific embodiment, the energy production rate display panel 140 includes information about the total energy production rate, the current electrical, and the thermal energy production rate. The current production display panel 140 can also display the current time at which the rate of energy production is measured. In a specific embodiment, the history diagram display panel 150 includes information about the total cumulative production energy, and individual totals for energy production for electrical, heating, and cooling applications. The display panel 150 also includes a diagram of past total energy production over a specified time span. The diagram of past total energy production over time allows the user to easily determine peak hours and off hours for his/her healthy home system. Also, the information related to cumulative energy production allows the user to readily determine and compare absolute values of energy produced for different applications within the healthy home. Again, there can be many other variations, modifications, and alternatives.

The alerts/notifications display panel 160, the system benefits panel 170, and the weather display panel 180 provide the user with additional useful information about the healthy home solar thermal system or information useful for comparison to the healthy home system output. In a specific embodiment, the alerts/notifications display panel 160 can include notices about routine checks or warnings regarding the operation of the healthy home, and the like. Also, the alert display panel 160 can include additional navigational features that are accessed by way of a mouse cursor positioned over a respective icon or link which allows to user to access additional windows within the user interface to control the operation of the healthy home system. In an embodiment, the system benefits panel 170 provides information about local and/or global benefits about the user's current healthy home system or the cumulative benefits of a community, specified region, and the like. The benefits panel 170 provides the user with information about the contributions he/she is making through the use of their healthy home system. In a specific embodiment, the weather display panel 180 provides the user with local weather forecast information for convenience. These display panels provide additional information and functions, but are not limited to the functions described herein, for the user's convenience.

It is also understood that the examples and embodiments described herein are for illustrative purposes only and that various modifications or changes in light thereof will be suggested to persons skilled in the art and are to be included within the spirit and purview of this application and scope of the appended claims. Further details of a specific technique for monitoring and verifying a solar thermal system can be found throughout the present specification and more particularly below.

Figure 2:
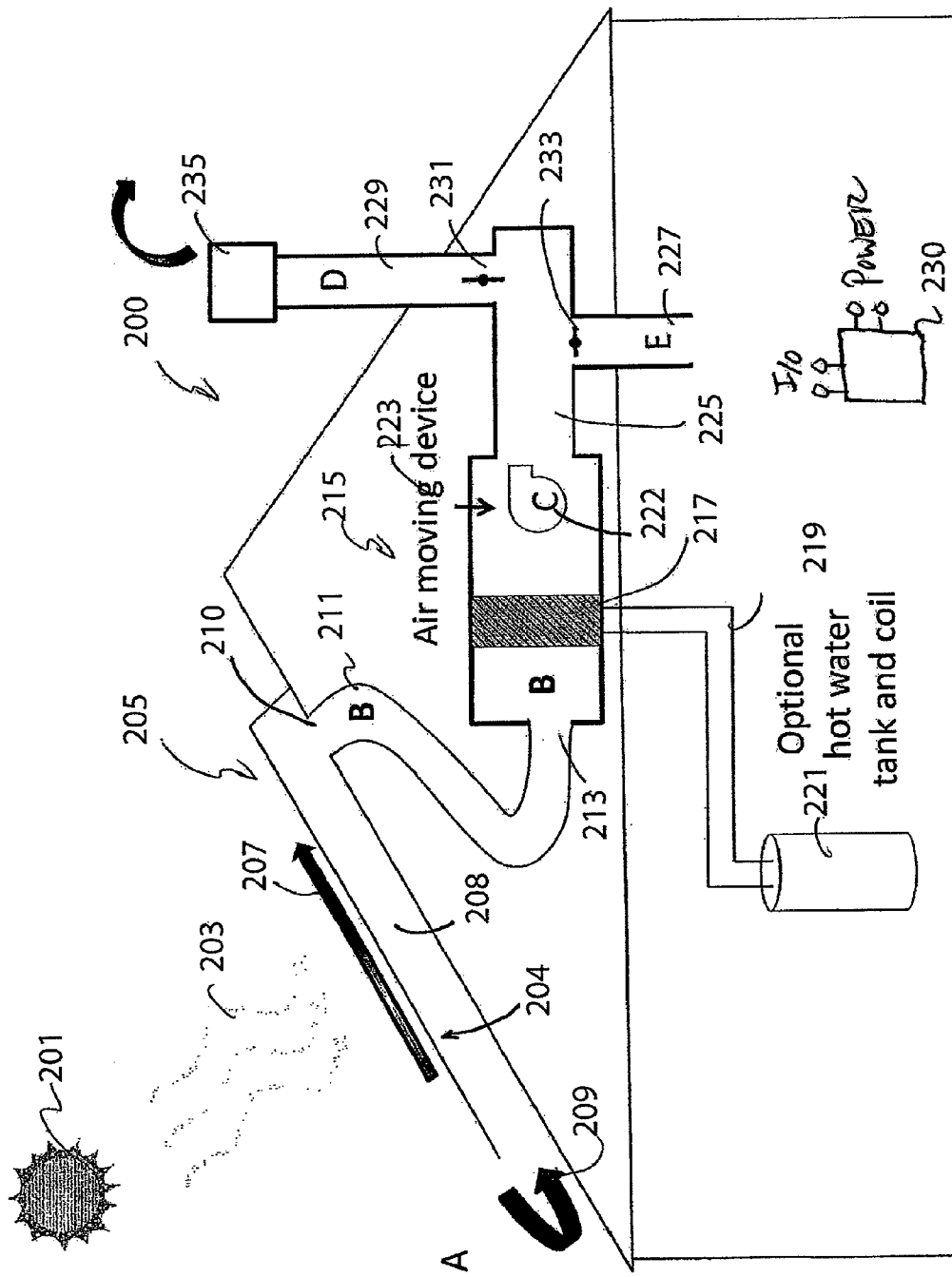
FIG. 2 is a simplified diagram of a solar thermal system implemented at a target location according to an embodiment of the present invention.

FIG. 2 is a simplified diagram of a solar thermal system implemented at a target location according to an embodiment of the present invention. This diagram is merely an example, which should not unduly limit the scope of the claims herein. One of ordinary skill in the art would recognize other variations, modifications, and alternatives. As shown, the solar thermal system 200 includes a plurality of thermal modules (or photovoltaic modules and/or combinations of thermal and photovoltaic modules) spatially configured as an N by M array, where N is an integer greater than 1, and M is an integer greater than 2 spatially disposed and attached to a building structure, such as a roof, building side, rack, or the like. In a specific embodiment, the plurality of thermal modules is configured to form an aperture region 205 and a backside region 204. In one or more embodiments, the solar thermal modules can be combined with photovoltaic modules or solely thermal modules or photovoltaic modules configured for thermal use to provide a heat source. Of course, there can be other variations, modifications, and alternatives.

In a specific embodiment, electromagnetic radiation 203 from the sun or other radiation source illuminates on the aperture region. In one or more embodiments, thermal energy is transferred through the solar module and applies the thermal energy to a working fluid 209 such as air, which traverses 207 in an upward direction through an air plenum 208 configured from at least the backside region. In a specific embodiment, the air plenum has one or more intake regions and one or more exhaust regions 210. In a specific embodiment, the one or more intake regions can be configured near a lower portion of the solar module array, although there can be other spatial locations. Additionally, the one or more exhaust regions can be a single exhaust region or multiple exhaust regions disposed spatially in a configuration near an upper portion of the solar module array. Of course, there can be other variations, modifications, and alternatives.

In a specific embodiment, the present system includes a shaped structure or thickness of material coupled to the backside region to form the plenum. In a specific embodiment, the shaped structure is integrally configured with the rack structure or disposed underlying the various components of the solar module or thermal array. In a specific embodiment, the shaped structure or thickness of material can be the pan structure coupled to the backside region. In a preferred embodiment, the shaped structure has a suitable thickness to prevent moisture from penetrating into the plenum region, but can also be vented according to one or more embodiments. Of course, there can be other variations, modifications, and alternatives.

Referring again to FIG. 2, the system has a first duct 210 coupled to the one or more exhaust regions 210. In a specific embodiment, the first duct can couple into a fluid flow region 215 having a fluid flow intake region 213 coupled to the first duct region, a fluid flow exit region 225, and an fluid drive region 223 spatially disposed between the fluid flow intake region and the fluid flow exit region. As used herein, the terms "fluid exit region" "fluid flow intake region" "fluid drive region" and others are not intended to be limiting and should be interpreted by ordinary meaning. Also shown are valves or dampers 231 233 which respectively connect to air pathways 229 and 233 to an outside region via exhaust 235 or back into a building structure via exhaust 227. Of course, there can be other variations, modifications, and alternatives.

In a specific embodiment, the system has an air moving device 222 comprising a drive device coupled to a blower device. In a preferred embodiment, the drive device is spatially disposed within the fluid drive region. In a specific embodiment, the drive device comprises an electric motor. In a preferred embodiment, the blower device comprises a fan device having a centrifugal configuration operably coupled to the drive device. Such blower device comprises a plurality of blades, which are configured to move high volumes of fluid and in particular air through the plenum. As shown, the drive device is disposed within a plenum region for fluid flow according to a specific embodiment. In a preferred embodiment, the fluid flow comprises air flow ranging in temperature from about 32 Degrees Fahrenheit to about 200 Degrees Fahrenheit based upon the temperature insulation rating of the drive device, which is spatially disposed within the air flow region.

In a specific embodiment, the system has one or more sensing device coupled to the controller device. In one or more embodiments, the controller device is coupled to one or more sensor devices operably coupled to the drive device. The one or more sensing devices are disposed spatially within a vicinity of the drive device according to a specific embodiment. In a specific embodiment, the sensing devices can be a thermocouple or other sensing device capable of receiving information that is indicative of temperature of the drive device. Of course, there are other variations, modifications, and alternatives.

In a specific embodiment, the system also has a controller 230 operably coupled to the air moving device. In a specific embodiment, the controller includes input/output for power, input/output for sensing devices; and input/output for control and/or feedback. As an example, the controller can be a computing system, including microprocessor device, memory, and input/output drivers and the like. Of course, there can be other variations, modifications, and alternatives.

Referring again to FIG. 2, the system has a second duct 225 coupled to the fluid flow exit region. As shown, the system can also include a heat exchanger 217 spatially disposed between the one or more exhaust regions and the air moving device to capture thermal energy in an efficient manner, while also reducing the temperature of fluid flow before it traverses over the drive device according to a specific embodiment. As shown, the heat exchanger couples to piping 219, which preheats water for the hot water tank 221 or other heating apparatus. Further details of the present system and related methods can be found throughout the present specification and more particularly below. A detailed description of the controller and solar thermal module are described more particularly below.

Figure 3:
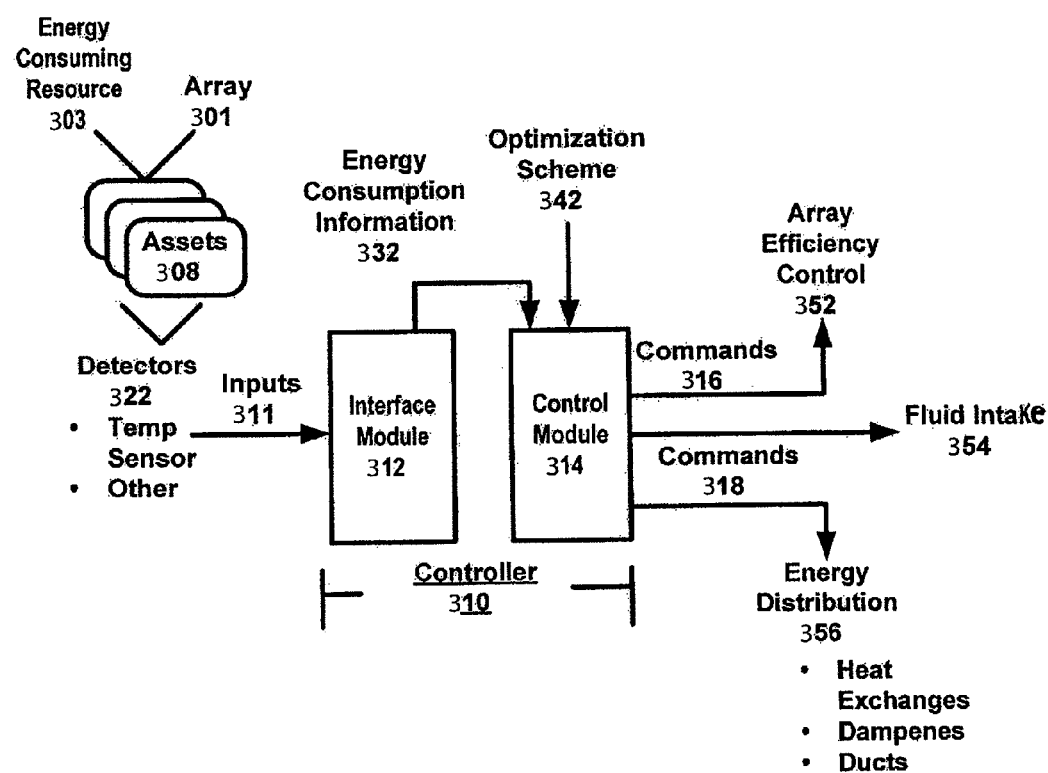
FIG. 3 is a simplified diagram of controller hardware according to an embodiment of the present invention.

FIG. 3 is a simplified schematic diagram of a controller hardware according to an embodiment of the present invention. This diagram is merely an example, which should not unduly limit the scope of the claims herein. One of ordinary skill in the art would recognize other variations, modifications, and alternatives. In a specific embodiment, a controller controls a solar module array and its usage at a target location, according to one or more embodiments of the invention. In a specific embodiment, a controller may be provided in connection with installation and use of a solar thermal system. The controller may be used in connection with a hybrid array, in which one or more solar modules of the solar thermal system serve the purpose of being a thermal generator. In a specific embodiment, the solar thermal system provides for a passage of fluid in proximity to an underside of the solar thermal system, for the purpose of cooling individual modules that comprise the system while collecting thermal energy as an output from the system. For example, air or other fluids may be directed in ducts or confined (or semi-confined) spaces just underneath the array so as to heat up from the operating temperature of individual modules in the system.

As will be described, the target location where controller 310 and the corresponding solar thermal system may be installed or implemented may correspond to a building, a home or dwelling, or other structure where electricity and/or heat is used. In a specific embodiment, a controller 310 is formed from components that include an interface module 312 and a control module 314. The interface module 312 may receive inputs from various remote and local sources regarding the energy consumption of different assets 308 within the target location. In other embodiments described herein, a remote and local bus is described for such sources.

The assets 308 include energy generating assets 301 and energy consuming assets 303 (or "loads"). Energy generating assets include thermal and electrical variety, and encompass the solar thermal system. Energy consuming assets remove energy (thermal or electrical) from the fluid (e.g. air steam). Energy consuming thermal assets may correspond to, for example, spaces where heating is provided, or sources of water that are heated (e.g. domestic hot water or swimming pool) or thermal mass components. Energy consuming electrical assets may correspond to, for example, systems that consume electrical energy (DC or AC).

In a specific embodiment, controller 310 receives input data 311 from detectors 322. The detectors 322 correspond to any equipment that ascertains the energy needs or consumption of the assets 308. These may include, for example, temperature sensors, pressure sensors, gauges, meters and other equipment. As described with other embodiments, a local bus may connect the controller 310 to the detectors to receive the input data 314. In another specific embodiment, the input data 311 is received in real-time, or as feedback to control implementations.

The interface module 312 may communicate energy consumption information 332 to the control module 314. The control module 314 may be equipped with programming or other logic to implement commands 316, 318, or other controls. In a specific embodiment, the commands 316 or 318 may include device commands, and thus may take form in mechanical transformation or action.

In a specific embodiment, the control module 314 uses the energy consumption information 332 in controlling devices that affect the efficiency of the solar thermal system. These devices may include, for example, a blower or other mechanism 352 that directs air flow underneath the modules of the array. For example, the blower may accelerate or decelerate airflow (or other fluid flow) under the solar thermal system. As an alternative or addition, the devices that effect the efficiency of the solar thermal system may include electromechanical control of fluid speed (assuming fluid may be something other than air), or ventilation input (fluid is air). In a specific embodiment, the control module 314 determines a range of efficiency for operation of the system based in part on the energy consumption information 332.

As an alternative or addition to affecting the efficiency of the solar thermal system, one or more embodiments may provide that the control module 314 controls the intake 354 of thermal output from the system. In a specific embodiment, the solar thermal system heats fluid through a combination of photovoltaic and thermal modules. The rate and manner in which the heated fluid (e.g. hot air) is taken into an energy distribution system of the target location may be affected by the control module 314, based in part on determinations made from the energy consumption information 332.

Still further, the control module 314 may configure the manner in which energy (both thermal and electrical) is distributed through the system of the target location. In particular, one or more embodiments provide that the control module 314 selects amongst energy consuming assets to service in a given duration with either heat or electrical output. The selection may optionally be based on one or more optimization schemes 342, as well as other criteria such as usage rules. The usage rules may dictate, for example, common sense measures, such as avoid heating the pool on cold days, or save high-electrical loads for non-peak hours. The usage rules may also dictate preferences or other measures that are known to accommodate a specific goal. In more detail, the optimization scheme 342 may also be in the form of rules, but factor a primary goal or set of goals as criteria. In a specific embodiment, the optimization scheme 342 may factor cost-saving criteria, so as to minimize the cost of energy consumption at the target location. As such, the optimization scheme 342 may factor in, for example, what assets 308 are services at a given time of the day based on the amount of irradiance that is present or expected, as compared to the cost of using energy from a utility source in that same period.

In order to implement the optimization scheme 342 and various rules as to how energy (thermal or electrical) is distributed, one or more embodiments provide that the control module 314 has access and control of energy distribution equipment 356. These may include, for example, heat exchanges that receive heated fluid and consume heat there from, ducts, dampers, and blowers/fans for moving air or other fluids. Such controls may be provided as an alternative or addition to the control of components that, for example, push or otherwise direct airflow under the solar thermal system.

In a specific embodiment, the controller 310, or portions thereof, is implemented in the form of a dedicated device that is mounted or otherwise placed in position to receive on-site electrical consumption information 332. Thus, for example, the controller 310 may be implemented in the form of a box, through hardware, firmware or software that directly communicates with, for example, temperature sensors and other equipment. In another specific embodiment, however, the controller 310 may be implemented on a computer, such as on a personal computer (desktop machine, laptop, small-form factor device, etc.) or a microcontroller. Still further, the controller 310 may be distributed, in that logic comprising the controller 310 or its modules may be distributed over multiple machines or devices, and/or at multiple locations.

Figure 4:
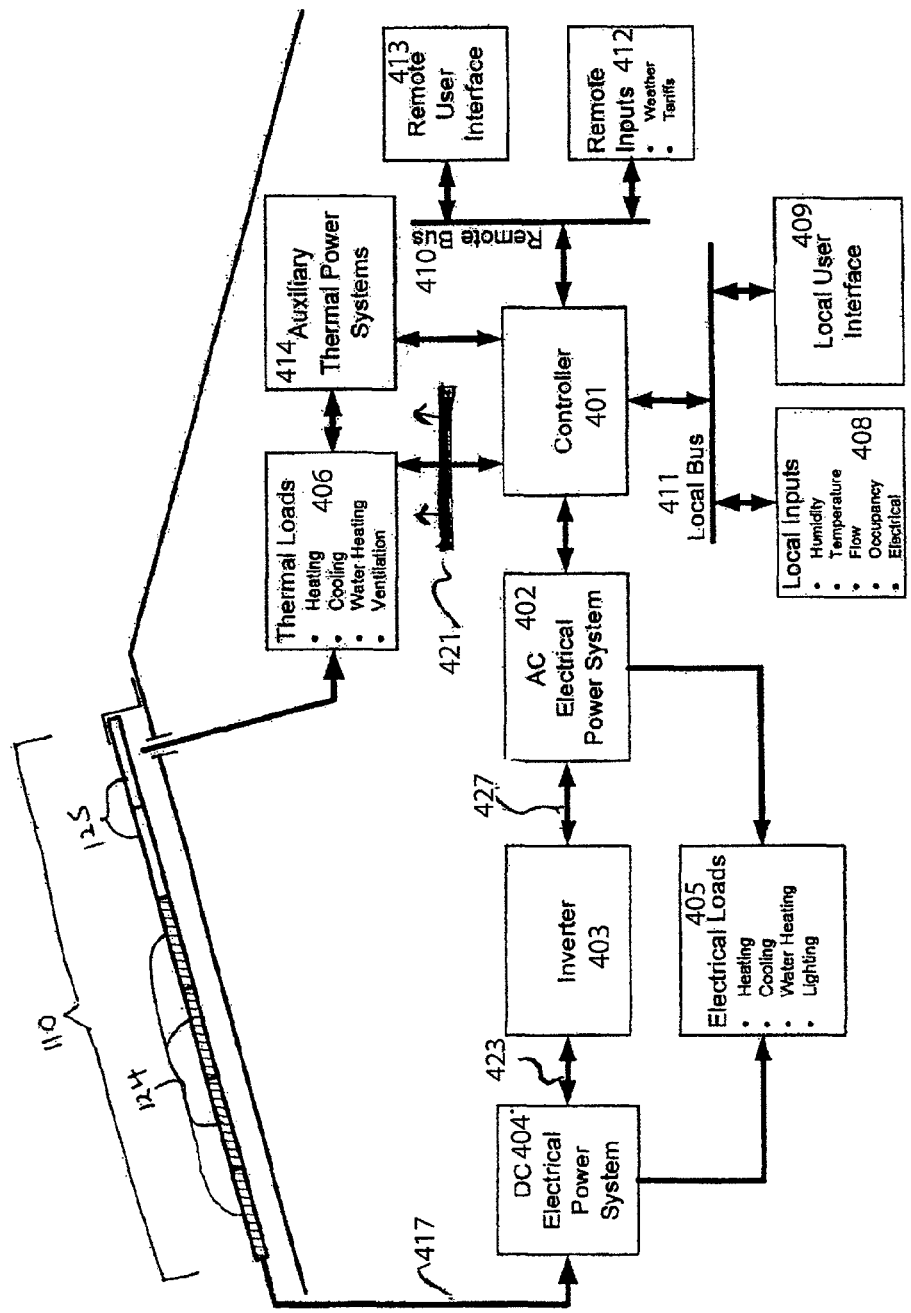
FIG. 4 is a simplified schematic diagram of a controller configured on the solar thermal system according to an embodiment of the present invention.

FIG. 4 is a simplified schematic diagram of a controller configured on the solar thermal system according to an embodiment of the present invention. This diagram is merely an example, which should not unduly limit the scope of the claims herein. One of ordinary skill in the art would recognize other variations, modifications, and alternatives. A system includes a controller 401 and control equipment 421 which combine to manage distribution and use of thermal energy output from the solar thermal system to any one or more thermal loads 406. The control equipment 421 includes hardware, firmware and/or software that is controllable by controller 401. As described with an embodiment of FIG. 2, examples of control equipment 421 may include (i) equipment that causes airflow under solar thermal system (e.g. blower 204), (ii) sensors, including temperature sensors (e.g. sensor 251), for reading information about incoming fluid or information about fluid downstream in usage by the system, (iii) heat exchanges, and (iv) dampeners and other equipment for directing fluid internally. Additionally, the controller 401 may be configured to interface with electric power systems, thermal components, user data, and a wide range of inputs within the system and the target location of the system.

In an embodiment, the system produces electrical power 417 from the PV modules which is fed into the DC Electrical Power System 404. The DC electrical power system 404 outputs DC power 423, which may then be fed either directly into electrical loads 405 that can operate on DC power, or to an alternating current inverter 403. The inverter 403 may convert DC power 423 to AC power 427. The AC power 427 may be supplied to the AC electrical power system 402. The AC power 427 may then be fed either directly into electrical loads 405 that can operate on AC power, or back onto the utility grid. The DC electrical power system 404, Inverter 403, and AC electrical power system 402 may be interfaced with the Controller 401. Depending on the inverter capability, information regarding both DC 404 and AC 402 electrical power systems may be queried by the controller 401 from the inverter 403. Alternately, transducers may be placed on the DC electrical power system 404 or AC electrical power system 402 to determine electrical production from the system, or consumption from the various electrical loads 405.

The controller 401 also interfaces to the thermal loads 406 including heating, cooling, water heating, ventilation systems and auxiliary thermal power systems 414 such as boilers, furnaces, air conditioners, heating elements, and other devices that can supply the thermal loads 406 in tandem with the solar thermal system.

Local inputs 408 may include, for example, humidity, temperature, flow rates, occupancy of the structure, electrical demand, and other information of a nature local to the structure that can assist in the ability to optimize system performances and load management through appropriate control strategies. The system may also have a local user interface 409 for direct communication with the controller 401 or interfaced devices such as the inverter 403, electrical power systems 402, 404 and auxiliary thermal power systems 414.

A remote data bus 410 enables communication of all remote inputs and remote user interface through any remote communication protocol. Examples of the remote communication protocol include wired and wireless Ethernet, mobile phone networks, satellite, and other communication protocols. A local data bus 411 provides the communication path for local inputs 408 and user interface 409 to the controller 401 and between devices. It may be possible that both the remote and local bus 410, and 411 use the same communication protocols. Either bus 410 or 411 may consist of one or more protocols operating in tandem to establish communications with separate devices.

According to an embodiment, a dedicated remote input 412 may be provided for the remote bus 410 to enable access to information such as weather data or tariff rates of utilities. The remote inputs 412 may provide an automated and programmatic mechanism to provide such information to controller 401 along with other relevant information.

Still further, one or more embodiments provide for other types of data to be accessed or provided to the controller 401 through the remote user interface 413. The remote user interface 413 may allow the user to enter data or parameters into the system controller or other devices in communication with the controller 401.

Figure 5:
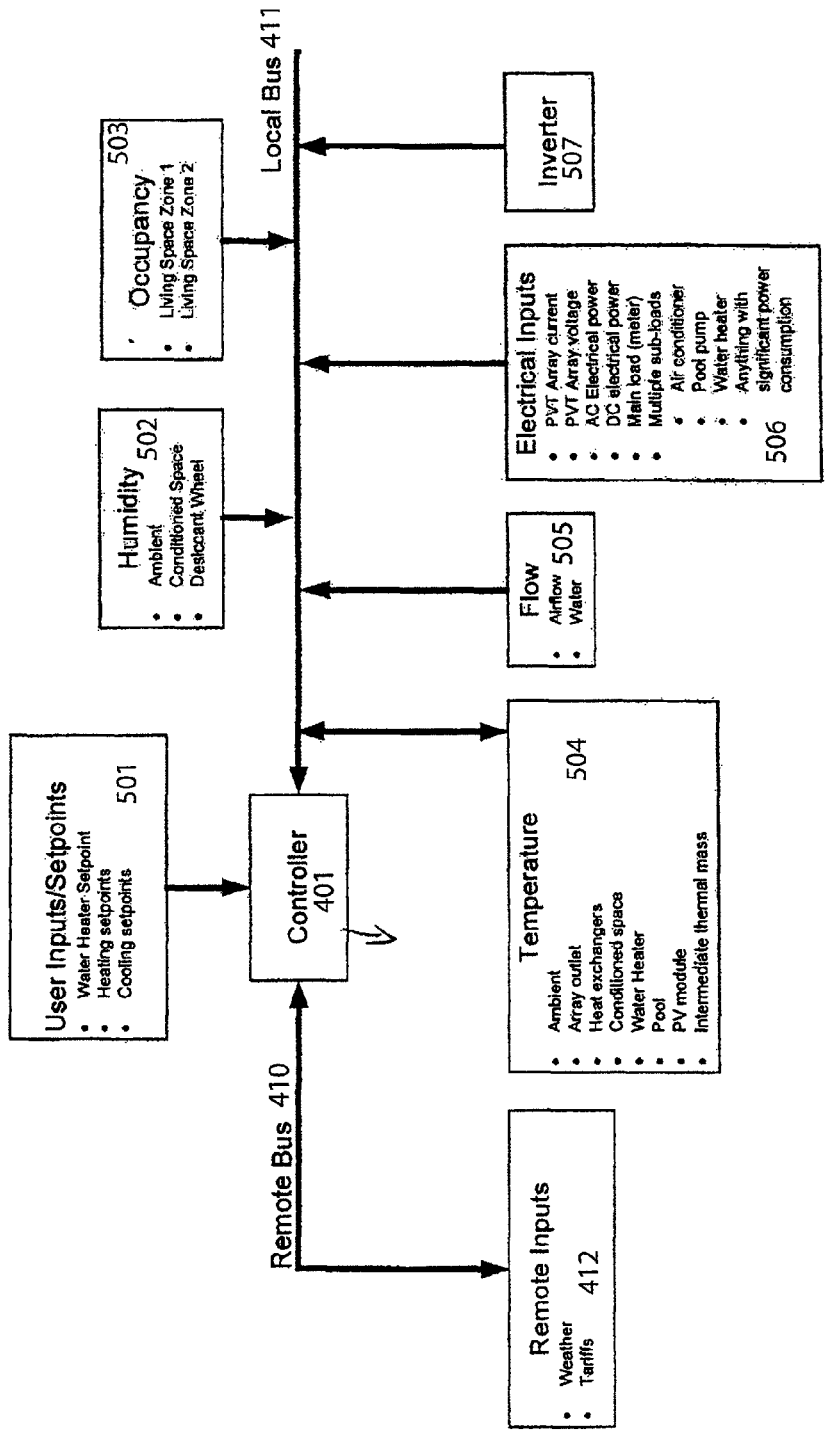
FIG. 5 is a simplified block diagram of different input components that are controllable by a controller, according to one or more embodiments of the present invention.

FIG. 5 is a simplified block diagram of different input components that are controllable by a controller, according to one or more embodiments of the present invention. This diagram is merely an example, which should not unduly limit the scope of the claims herein. One of ordinary skill in the art would recognize other variations, modifications, and alternatives. With reference to an embodiment of FIG. 4, controller 401 can receive many inputs from a variety of local sensors and through the remote and local busses 410 or 411. Access to system data and information may be relevant to the ability to create control strategies and algorithms that optimize system performance. As described, the inputs may be in the form of information, including User Inputs/Setpoints 501, humidity input 502, occupancy information 503, temperature information 504, flow information 505, electrical inputs 506, and inverter data 507. In an embodiment, controller 501 receives User Inputs/Setpoints 501 through the local user interface 509 or the remote user interface 513. Examples of User Inputs/Setpoints 501 may include occupancy status, water heater setpoint, heating and cooling setpoints for the conditioned space, and other operational setpoints.

Humidity input 502 may be provided through sensors that are positioned to detect humidity from, for example, ambient air, the conditioned space, and/or airstreams within the systems that may include thermal storage, heat exchangers, desiccant wheels or heat recovery systems.

Occupancy information 503 may be automatically sensed by ultrasonic or infrared sensors typically used in motion detectors. The structure can be divided into zones and occupancy can be reported to the controller by zone. As an alternative or addition, occupancy information 403 may be inferred from, for example, usage of appliances through a monitoring of electrical loads 405.

Temperature information 504 may be collected from various sources. One or more embodiments provide that the temperature information may be provided by measurements that are made for a determined optimal operation of the system. With reference to an embodiment of FIG. 5, the temperature information 504 includes, for example, the reporting of ambient air temperature through sensor 255 (FIG. 2), array output temperature through sensor 215 (FIG. 2), the temperature after fluid passes through heat exchangers at sensor 252 (FIG. 2), air temperature in conditioned space 221 through sensor 256 (FIG. 2), temperatures in the water heater through sensors 253 and 254 (FIG. 2), and other temperature measurements as may be required by the system.

Flow information (and/or inputs) 505 may include information that identifies or indicates the volume of air flowing through a particular duct or section of the system and the flow of liquids in hydronic loops. Flow information 505 may be in various forms, such as in the form of actual mass or volumetric flows, and/or in the form of simple on/off indicators as to whether flow exists or not.

Electrical inputs 506 include, for example, current and voltage provided by the PV modules, outputs from DC electrical power system 404 (FIG. 4), outputs from AC electrical power system 402, the main meter for the structure, and the load demand for individual or multiple sub loads 405. Examples of sub loads 405 include air conditioners, pool pumps, lighting, water heaters and/or anything with electrical power consumption to be metered.

The controller 401 may also interface with the inverter 403 to obtain operating information regarding the electrical performance of the inverter, the current and voltage characteristics of PV modules connected to the inverter 403, and the export of power from the inverter 403 to the AC electrical power system 402.

In addition, the controller 401 can receive data from remote inputs. The data from remote inputs may include, for example, weather data, energy pricing, and tariff schedules from the utility for energy. These and other data sets may be provided to the controller over the remote bus 410, user inputs 501, or potentially the local bus 411.

Figure 6:
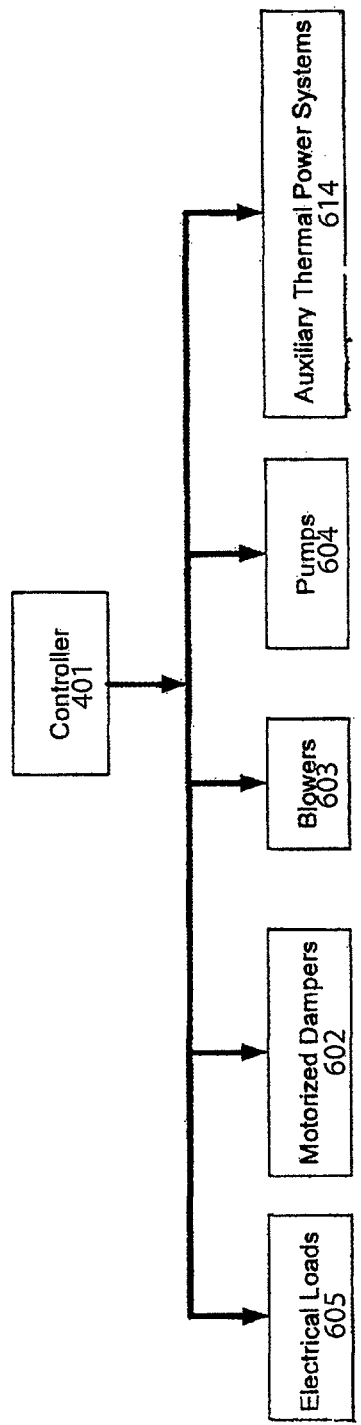
FIG. 6 is a simplified block diagram of different output components that are controllable by a controller for use as part of a system for performing optimization operations, according to an embodiment of the present invention.

FIG. 6 is a simplified block diagram of different output components that are controllable by a controller for use as part of a system for performing optimization operations, according to an embodiment of the present invention. This diagram is merely an example, which should not unduly limit the scope of the claims herein. One of ordinary skill in the art would recognize other variations, modifications, and alternatives. The physical elements may not only optimize generation of the solar thermal system, but also facilitate or enable control and regulation of any electrical loads 605 or components of the thermal power systems 614.

In one embodiment, controller 401 is connected to regulate or modulate any of the electrical loads 605 connected to the DC electrical power system 404 (FIG. 4) or AC electrical power system 402 (FIG. 4), as indicated by output block 605. The controller 401 may also operate any combination of blowers 603 and dampers 602 to move and direct airstreams to transfer thermal energy. Operation of pumps through output block 604 is also possible. Control over auxiliary thermal power systems 605 is also possible and allows coordination of generation from the system and these backup energy systems. Additional output blocks may be provided as necessary for the controller 401 to interface with and influence any system components that may impact the generation or use of energy within the structure.

One or more embodiments provide for using controller 401 in order to implement strategies or optimization schemes for different criteria. In an embodiment, the controller 401 may simultaneously assess the demands of the various loads within the target location. These loads may include, for example, water heating, space heating, ventilation, and electrical consumption. The loads may be assessed in tandem with (i) the ability of the system to provide the electrical and thermal power outputs to service these loads, and optionally (ii) in connection with criteria or parameters for optimizing the electrical/thermal outputs.

Under an embodiment, the optimization required by the controller 401 can be divided into several components. A first part of the optimization provides for the controller to set the ventilation rate Vo for the system which is dictate the thermal and electrical operating efficiencies ($\eta$thermal and $\eta$electrical), and therefore array outputs at a given set of ambient conditions. Setting of the ventilation rate Vo may include one or more of the following considerations:

(i) For any thermal load, the controller 401 should assess the temperature at sensor 251 (FIG. 2) necessary at the array outlet 201 (FIG. 2) required to service the particular load. For practical purposes the array outlet temperature at 251 should exceed the load temperature by a reasonable margin to promote heat transfer. Examples of representative load temperatures would be the temperature of the water heater at sensor 253 (FIG. 2) or conditioned space 221 (FIG. 2), but may be that of any load.

(ii) The controller may assess whether it can provide this array outlet temperature 251 under prevailing ambient conditions such as solar irradiance, ambient temperature 255, and other conditions such as wind speed that might affect performance of the solar thermal system. In one embodiment, this assessment is made responsive to the assessment of the thermal load. The assessment for the array outlet temperature at sensor 251 may be made by varying the ventilation rate Vo and monitoring outlet temperature at sensor 251, or by referencing a known performance map for the system that is stored in the controller which describes operation over a broad range of environmental conditions.

(iii) The controller 401 may subsequently or responsively assess the combined thermal and electrical operating efficiencies ($\eta$thermal and $\eta$electrical) that govern the overall efficiency, as well as the output of the system at the operating temperature required by the loads the system is capable of servicing.

In an embodiment, a second part of the optimization is related to how controller 401 sequences or modulates the thermal energy provided at the array outlet 201 among the various thermal loads. In most physical layouts of the loads, such as those depicted in FIG. 2, the system is capable of providing DHW service and space heating simultaneously. In regards to FIG. 2, the controller 401 may regulate the amount of energy provided to the water heater 217 by modulating the operation and speed of pump 216 to extract varying amounts of energy from the air stream through heat exchanger 203. Pulling more energy from the airstream for the water heater 217 using heat exchanger 203 leaves less energy for space conditioning to be provided through damper 206 and vent 212 into the conditioned space 221.

The controller may subsequently decide upon which use of the energy is more important in determining the modulation of energy between the loads. In the case of the embodiment illustrated with FIG. 2, in which the backup heating for the water heater 217 is be provided by an electric element 220, it may be more critical to supply this load on first priority so as to prevent electrical consumption by the electric element 220. Such an optimization scheme may best be implemented if the backup heating system for the conditioned space 221 is provided by a high efficiency furnace using lower cost natural gas. However, if the backup means for heating system is provided through electrical resistance heating, then the cost of providing energy to water heater 217 or conditioned space 221 may essentially equal each other. The controller 401 may then determine which load to service to maximize array output.

Another optimization scheme or sub-scheme may be provided in connection with the thermal production and electrical production of the system. Embodiments of the invention recognize that maximizing PV production at the expense of thermal production would, in many cases, demand a maximum ventilation rate Vo by blower 204 (FIG. 2), at least to the practical point where the gains in electrical output and efficiency $\eta$electrical are mitigated by parasitic consumption in the blower 204. However, operating the blower 204 at high ventilation rates Vo results in relatively low outlet temperatures for the array. The array outlet temperature at sensor 251 in these scenarios may be below an utilizable temperature for space conditioning or DHW production. For instance, a case could be imagined where ambient temperature is 5° C., and where the blower 204 operates at full speed to maximize PV output. In such a scenario, the array outlet temperature at sensor 251 may be 18° C., which is not sufficient to provide space heating. By lowering the blower 204 speed slightly, it may be possible to achieve 26° C. array outlet temperatures at sensor 251 that only slightly lowers efficiency and production of the PV modules 124, but provides a significant contribution to heating and ventilation of the conditioned space 221.

In an embodiment, controller 401 may be configured to perform multivariate optimization in the control of the speed of the blower 204, pump 216 and/or operation of dampers 205 and 206. Such control may be used to maximize the net energy production of the system 110 in both thermal and electrical energy production. It should be noted that the controller does not necessarily discretely change operating modes from 100% service of anyone mode to another, but instead may often perform triple-generation in the form of modulating and optimizing the energy gains of all three modes of operation simultaneously. This is as a result of system being capable of providing electrical power to the DC electrical power system 404, DHW production, and space conditioning simultaneously. The controller 401 may be structured to give preference to one particular mode of generation over another through variable speed operation of the blower 204 and pump 216, as well as effecting the positions of the dampers 205 and 206.

With regards to operation of controller 401, the controller may be equipped to implement various schemes that factor various priorities and variables. These schemes may range from simple weighted priorities of each load on the system to a complex multivariate analysis of system efficiencies, costs of providing auxiliary energy, physical characteristics of the structure including occupancy, load profiles, and thermal response of the structure. Additionally, one or more embodiments provide that weather data is used to anticipate and estimate energy production from the system, as well as demands of the loads that may be comprised of electrical loads 405 and thermal loads 406 that are sensitive to weather.

Some representative examples of how these inputs and factors may be weighted into the controller's decisions on how to optimize operation of the system are provided in the following.

Embodiments of the invention recognize benefits in the controller 401 knowing the source and efficiency of the auxiliary thermal power systems 414 that provide energy to the loads in tandem with the system. With respect to FIG. 2, for example, the auxiliary thermal system for the water heater 217 is the electric heating element 220, but may take other forms. In such cases, controller 401 may operate to prevent or reduce the auxiliary thermal power systems 414 from operating to consume energy in the form of electricity, natural gas, propane, or other base fuel. The optimization scheme of controller 401 may include information that identifies the auxiliary thermal power systems, as well as their operating characteristics and energy consumption costs. Additionally, knowing the cost of the fuel to operate the backup systems when combined with the efficiency of the devices may assist the controller 401 in determining the cost of providing auxiliary power to any load. The types of auxiliary thermal power systems 414, their efficiency, and fuel source may be programmed into the controller 401 using any of the remote user interface 413, local user interface 409, or other means. Likewise, cost of the fuel used to operate these systems may be programmed into the controller 401 through similar means, or queried as a remote input 412.

In addition to the base cost of fuels, fuel costs may include time-variant components, in which the cost of the energy varies by time of day, or time of year. As an example, several electric utilities offer a time of use rate where electricity may cost $0.29/kWh on-peak from 12:00-19:00 and $0.09/kWh off peak during the remaining hours. Superimposed on this rate schedule can be a shift in base electricity cost during summer and winter period. Rate schedules like these are often employed and advantageous for installations of PV modules that generate energy during the on-peak period.

One or more embodiments of the invention configure controller 401 to be aware that the structure of the target location is utilizing such time-variant rates. In such an embodiment, controller 401 may be configured to optimize for maximum electrical generation from the PV modules during the on-peak time and act to defer any loads using electricity until after peak. As an example, if the auxiliary thermal power systems 414 includes a (i) furnace for heating the conditioned space 221 by natural gas, and (ii) a water heater 217 powered by an electrical element, then controller 401 may be configured to optimize for DHW production during the on-peak time to prevent the electrical element from consuming on-peak electricity, while allowing the auxiliary system for heating the conditioned space 221 with natural gas to operate, which traditionally does not have a significant time-variant rate.

While current time-variant rates are mostly structured by set times of the day, there is movement in markets towards 'real time pricing' in which a spot market approach is used to set rates in real time. In such a case, the controller 401 may be configured to access real time rates as a remote input 412 over the remote bus 410, and to factor the real-time rates in optimizing the mix of thermal and electrical energy production from the system. This may be done as part of an optimization scheme to minimize operating costs of the auxiliary thermal power systems 414, AC electrical power systems 404 servicing the loads in real time.

Still further, another optimization scheme may be provided as follows. In some utility rate structures the cost of energy is 'tiered' in that a baseline rate is established with escalating tiers of rates beyond the baseline. If the controller 401 has knowledge of the tier structure and energy consumption of the structure, then the controller can implement optimization control based on this usage tiered pricing in its goal of minimizing energy costs. This can be done by giving preference on generation of the system towards those loads whose auxiliary energy systems use fuels whose usage is approaching higher tier rates. The controller 401 may acquire knowledge of the tiered rate structure using the remote user interface 413, remote inputs 412, local user interface 409, or other means. Knowledge of energy consumption to compare against the tiers can be provided to the controller by monitoring the electrical inputs 506 in the form of the main load (meter) or monitoring of sub-loads.

In determining another optimization scheme, one or more embodiments may factor in situations where the utility source has demand charges for electricity that is a fixed charge based upon peak monthly power consumption at the target location. Such demand charges can constitute significant portions of the total utility charges for the target location. Since the controller 401 has the capacity to monitor the electrical production from the solar thermal system, as well as the consumption of various loads through input block 506, controller 401 may be configured to minimize coincident net power consumption. This results in the lowering the demand charge, and therefore total energy costs.

With regards to electrical energy output of the system, the physical characteristics of the structure do not often impact the energy production other than physically supporting the array. With regards to the thermal energy output of the system, the physical characteristics of the structure and loads can have significant impacts on energy production of the system, as well as the consumption of fuel from the auxiliary thermal power systems 414. These characteristics range from the thermal mass of the conditioned space 221 to occupancy profiles of the structure, and consumption profiles from the water heater 217. There are many possible ways for the controller 401 to utilize these physical characteristics as part of implementation strategies or optimization schemes.

In a specific embodiment, numerous mechanisms and means may be used to detect occupancy of the target location. In the structure of a home or building, occupancy may be detected with, for example, occupancy sensors 503, although other measurements (e.g. appliance or lighting usage) may also be detected and used. If the structure is determined to unoccupied, the controller may permit the temperature of the conditioned space 221 as monitored by sensor 256 to float outside of the typical range. Furthermore, DHW production may be reduced or even eliminated. Therefore, the controller 401 may maintain the space in a wide, but reasonable temperature range that would minimize energy demands from any auxiliary thermal power systems 414 for space conditioning. In a similar manner, the controller 401 may completely avoid DHW production from both the system as well as from any auxiliary thermal power systems 414. Because electrical production from the system can often be stored on the utility grid as a valuable credit for later consumption, the controller 401 may be configured to optimize efficiency $\eta$electrical of the PV modules to create a credit for later electrical demand.

In addition to the two states of the structure being occupied or unoccupied, embodiments recognize that the actual occupancy and load profiles can shift over the course of a day and/or seasonally. For example, in case where target location is a residence of occupants that work elsewhere, there may be high morning and evening demands with few mid-day demands, as the occupants may be at work. Thus, there are anticipated time periods where the conditioned space 221 is empty. In a business setting, the occupancy and loads are typically inverted from this residential case. As a result, the thermal loads such as DHW production from the water heater 217 can be reduced mid-day for a residential setting. Likewise, the temperature of the conditioned space 221 as monitored by sensor 256 may be allowed to swing outside a narrowly controlled range, and the water heater 217 need not be at a full setpoint temperature for DHW service (as monitored by the upper tank temperature 254). By allowing strict setpoints to vary, energy production from the system may be further optimized by increasing the energy that these loads can store, as well as the use of auxiliary thermal power systems 414 is minimized by reducing setpoints.

As an example of a load profile strategy, water heater 217 may be assumed to have sufficient thermal capacity to provide morning showers for the occupants. After morning showers, however, the temperature at the top of the water heater 217 as monitored by sensor 254 becomes lower than a user supplied setpoint 701. Embodiments recognize that instead of using the electric element 220 to recharge the water heater 217 in the early morning before energy is available from the system, the controller 401 may be configured to infer the occupancy habits of the structure, Specifically, controller 401 may determine when the target location (e.g. residence) is unoccupied (e.g. starting at mid-morning) and then disable the electric element 220 in anticipation that energy would be available from the system to heat the water heater 217 a few hours later. Thus, the controller 401 may be configured to recognize that the hot water does not need to be immediately replenished, but rather can be replenished later in the day when more energy is available from the system. In a similar manner, the controller 401 may allow the temperature of the conditioned space 221 as monitored by sensor 256 to drop during unoccupied times.

As an alternative or addition, the controller 401 may permit heating the conditioned space 221 above the desired set-point temperature during the middle of the day knowing that the temperature in the conditioned space 221 as monitored by sensor 256 would reach a suitable level when the occupants returned. In this way, controller 401 can use the conditioned space 221 as thermal energy storage. Such usage would not normally be possible if strict set-points of the temperature in the conditioned space 221 were maintained at all times.

The most direct method of inferring occupancy of the structure is through the use of occupancy sensors 503 that can communicate over the local bus 411 with the controller. However, an embodiment recognizes that occupancy and usage may be inferred by other system parameters accessible to the controller 401 through, for example, the local bus 411. One such method would be to evaluate changes in the power requirements of any electrical loads 405, such as lighting or usage of major appliances (e.g. washing machine) that would be associated with occupancy and monitored through electrical inputs 506.

It is also understood that the examples and embodiments described herein are for illustrative purposes only and that various modifications or changes in light thereof will be suggested to persons skilled in the art and are to be included within the spirit and purview of this application and scope of the appended claims. Further details of a specific technique for monitoring and verifying a solar thermal system can be found throughout the present specification and more particularly below.

Figure 7A:
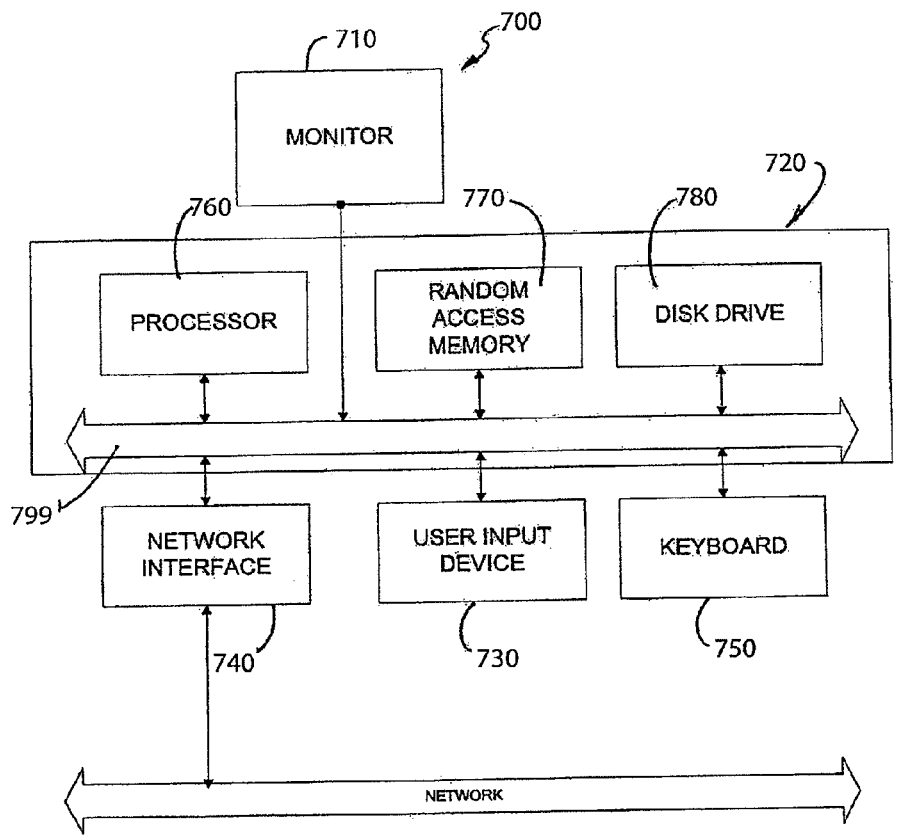
FIG. 7A is a simplified diagram of a hardware diagram according to an embodiment of the present invention.

FIG. 7A is a simplified block diagram of a system 700, according to an embodiment of the present invention. This diagram is merely an illustration and should not limit the scope of the claims herein. The system 700 includes a monitor 710, a computing system 720, a user input device 730, a network interface 740, and a keyboard 750. Computing system 720 preferably includes familiar components such as a processor 760, and memory storage devices, such as a random access memory storage devices, such as a random access memory (RAM) 770, a fixed disk drive 780, and a system bus 799 interconnecting the above components. User input device 730 may include a mouse, a trackball, a keyboard, a keypad, a joystick, a digitizing tablet, a wireless controller, a microphone, or other input devices.

RAM 770 and fixed disk drive 780 are mere examples of tangible media for storage of computer programs, audio and/or video data, and code implementing embodiments of the present invention. Other types of tangible media include SRAM, floppy disks, optical storage media such as CD-ROMs and bar codes, semiconductor memories such as flash memories, stick memories, read-only-memories (ROMs), ASICs, battery-backed volatile memories, and the like.

Network interface 740 may be any type of interface to a computer network. For example network interface 740 may be a cable/DSL/telephone modem, an Ethernet or fast Ethernet interface, a LocalTalk connection, or the like. As disclosed above, the computer network may be any type of network such as the Internet, an Intranet, an IPX network, private tunnel, local area network (LAN), WAN, and the like.

In a preferred embodiment, computing system 720, includes a microprocessor, such as a Pentium III from Intel Corporation, a K-7 processor from Advanced Microdevices, or the like running Windows XP™ operating system from Microsoft Corporation of Redmond, Wash., BeOS, LINUX, or the like.

Many other systems, such as MacOS™ from Apple Corporation, running upon G3 based microprocessors, or Solaris™ from Sun Microsystems or UNIX running upon a SPARC station, and the like can also be used.

The system above discloses examples of configurations that embody the present invention. It will be readily apparent to one of ordinary skill in the art that many systems types, configurations, and combinations of the above devices are suitable for use in light of the present disclosure. Of course, the types of system elements used depend highly upon the application.

In light of the disclosed embodiments, enhancements to the present invention are envisioned. For example, it is envisioned that users will be able to define custom actions and assign such actions to custom icons for display on the healthy home monitoring system. Some examples of custom user interfaces have been described above and will be described in further depth below.

Figure 7B:
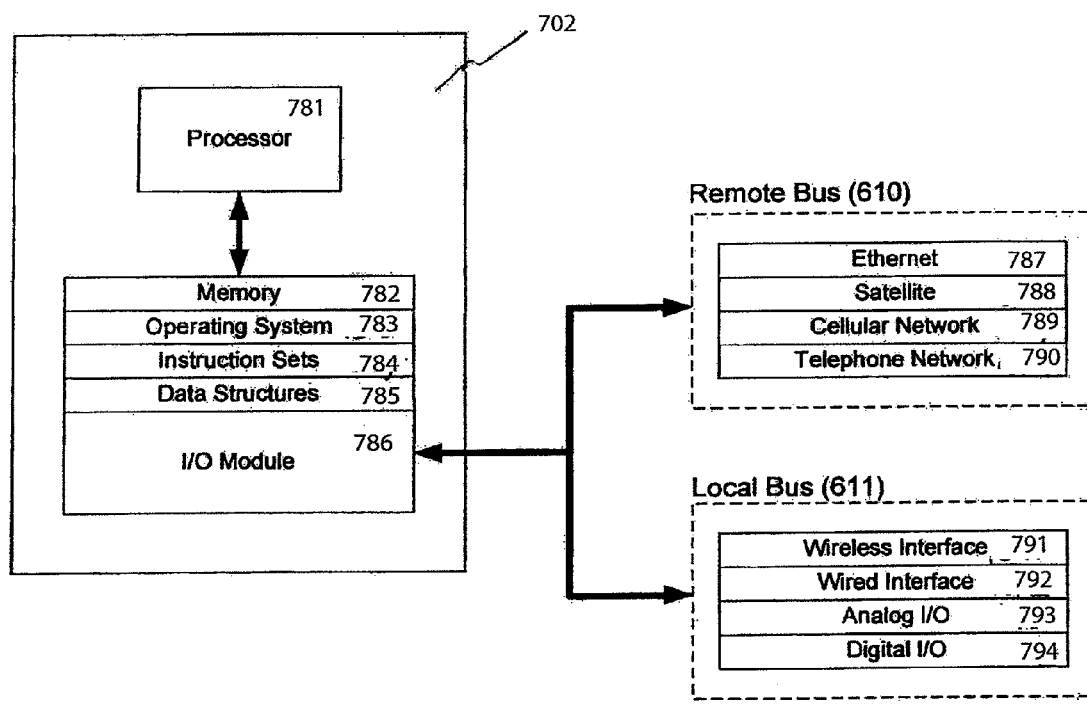
FIG. 7B is a simplified diagram of a hardware diagram according to another embodiment of the present invention.

FIG. 7B is a simplified block diagram of a system 700, according to another embodiment of the present invention. This diagram is merely an illustration and should not limit the scope of the claims herein. According to numerous embodiments described herein, a controller 702 can be provided for use in cooperation with an array and a system for utilizing output from the array. The controller 702 may be used to achieve the functionality described herein, including functionality described with embodiments that utilize the controller 401. While numerous components and functionality are described for controller 702 below, it should be apparent that not all components and functionality are needed for a particular embodiment or implementation.

In a specific embodiment, controller 702 includes a processor 781 capable of performing the necessary computations and logic to carry out the procedures and optimizations outlined elsewhere. To assist in these tasks and others, the controller 702 may contain an I/O module 786 and memory 782 of a non-volatile form for storing an operating system 783, instruction set 784, data structures 785, and an I/O module 786. The memory 782 may also contain a volatile component used for temporary storage required by the processor 781.

The controller may take the form of a computer system, dedicated microcontroller, or other device capable of achieving this or similar functionality.

The instruction sets 784 may contain the necessary code to carry out the various operations required by the controller 702, such as, for example, the optimization routines and management of the various inputs and outputs of the I/O Module 786. The data structures 785 may be capable of storing operation data from the system including sensor data, calculated energy, setpoint parameters and any other data required by the controller 702.

The I/O module 786, provides communications with systems, components, and services outside of the controller. The I/O module may interface these items through a remote or local data bus 610, 611.

Communication over a remote bus 610 may be enabled by one or more protocols including but not limited to Ethernet 787, satellite 788, cellular network 789, or telephone network 790. Hardware and software to implement these protocols may be embedded into the controller as part of the I/O module 786 or exist as separate components in communication with controller 702 through the I/O module 786. The controller 702 may communicate over the remote bus 610 using any one or more multiple protocols (787-790) simultaneously.

The local data bus 611 exists primarily as a means of communication with local sensors, inputs, and components. Communication over the local bus may be enabled by one or more protocols including but not limited to the following. A wireless interface 791 such as IEEE 802.11, IEEE 810.15.4, or others. A wired interface 792 can include those such as Ethernet, serial communication, parallel communication, power line carrier such as X-10, or others. Analog I/O 793 can include those such as voltage inputs and outputs, current inputs and outputs, or other. Digital I/O can include those such as low-level binary inputs & outputs, power relays, pulse width modulation, or others. Hardware and software to implement these protocols may be embedded into the controller as part of the I/O module 786 or exist as separate components in communication with the controller 702 through the I/O module 786. The controller 702 may communicate over the remote bus 791 using multiple protocols (787-790) simultaneously.

FIGS. 8A-8E are simplified flow diagrams of an animation method for a healthy home according to an embodiment of the present invention. These diagram is merely examples, which should not unduly limit the scope of the claims herein. One of ordinary skill in the art would recognize other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

Figure 8A:
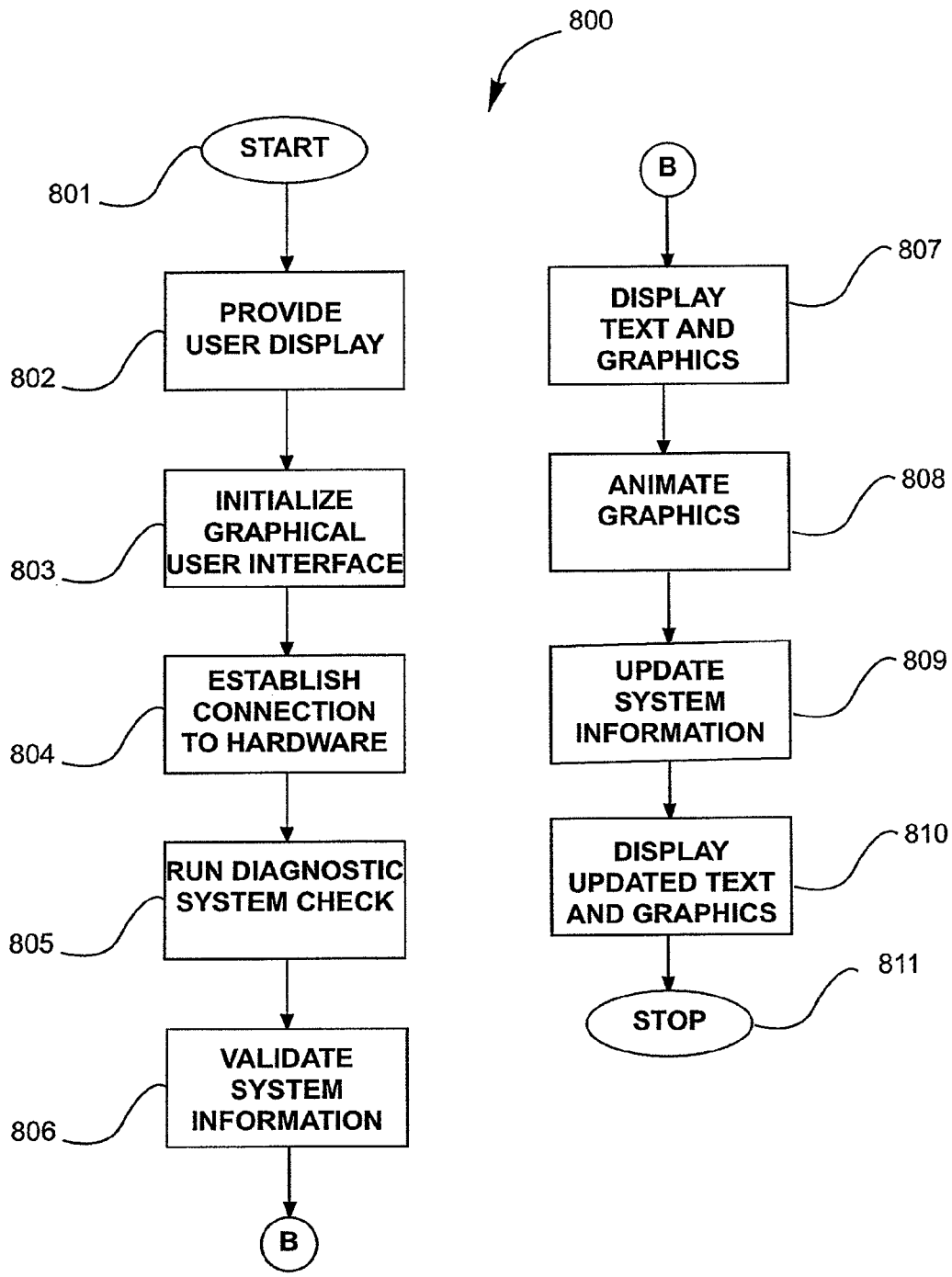
FIGS. 8A-8E are simplified flow diagrams animation methods for a healthy home according to an embodiment of the present invention.

As shown in FIG. 8A, the present method can be briefly outline below.

1. Start;
2. Provide a user display including a hardware housing coupled to a display device;
3. Initialize healthy home graphical user interface;
4. Establish connection between user display and healthy home solar thermal system through a graphical user interface;
5. Run diagnostic system check through the controller to determine healthy home system operating status;
6. Validate information retrieved from the associated hardware components of the healthy home;
7. Display related system information and graphical illustrations representing the status of the healthy home solar thermal system;
8. Animate characteristics of the graphical illustrations according the determined system operating status;
9. Update system information and graphical illustrations according to a specified scheduling scheme;
10. Display updated system information and graphical illustrations and related animations according to the scheduling scheme; and
11. Stop.

These steps are merely examples and should not unduly limit the scope of the claims herein. As shown, the above method provides a way of initializing the graphical user interface for the healthy home according to an embodiment of the present invention. In a preferred embodiment, the method first initializes the user interface, runs diagnostic checks on associated hardware of the healthy home, retrieves information about energy production, retrieves information about system updates and local weather, and then displays all related information within designated panels of the user interface. One of ordinary skill in the art would recognize many other variations, modifications, and alternatives. For example, various steps outlined above may be added, removed, modified, rearranged, repeated, and/or overlapped, as contemplated within the scope of the invention.

As shown in FIG. 8A, the method 800 begins at start, step 801. The present method provides a method and device for monitoring the operating status of a healthy home solar thermal system implemented at a target location according to an embodiment of the present invention. Providing the user with accurate and reliable information regarding the operation of his/her healthy home system is beneficial, not only from the vantage of keeping the user well-informed and operating parameter modifications to be done, but also from the validation and the confidence of the recorded data. In regards to this latter point, the validated information can play a role in standards for data consistency within incentive programs. Here, the method begins at a healthy home solar thermal system implemented at a target location.

The user display including a hardware housing coupled to a display device can be used to run the healthy home graphical user interface, step 802. In a specific embodiment, the hardware housing is made of plastic, or any sturdy moldable material. In an embodiment, the hardware housing includes a processor device coupled to a bus and one or more memory devices. The processor device can be coupled to one or more input devices wherein the one or more input devices are coupled to at least the solar array. In another embodiment, the input devices can be coupled to the electric panel, the space heater, the water heater, as well as other components of the healthy home. One skilled in the art would recognize many variations, modifications, and alternatives.

The healthy home graphical user interface begins the initialization of the graphical illustration panel by first initializing the graphical user interface for the healthy home, step 803. The user interface can be initialized on any personal computer, computing system, or computing device that can run the user interface program, display the graphical contents, and accept user inputs through an input device, such as a mouse, keyboard, and the like. The initialization process is followed by a series of system checks to establish the working status of the associated hardware within the healthy home system, step 804. In a specific embodiment, the checks include confirming the working status of the solar array, electric panel, space heater, water heater, as well as others, of the healthy home. Of course, there can by many variations, modifications, and alternatives.

Once the associated hardware has been established, a diagnostic check is run on all associated hardware to determine detailed information about the operative status of the healthy home system, step 805. Additional acknowledgement or system signals can be sent to the controller for the healthy home to retrieve additional information, such as related thermal and electrical information, energy production information, and the like. The diagnostics are then validated to check for consistency of the acquired system information, step 806. Data validation can occur through a variety of methods, such as comparing the diagnostic values to theoretical data, to other healthy home systems in the local area, or any other like method of comparison. In a specific embodiment, the validation of the system operation can include cross-checking the operative status of all associated hardware by comparing relative production of energy or other operative values. Again, there can be many other variations, modifications, and alternatives.

The validated diagnostic data is used to display information and graphical illustrations of the working status associated with each of the hardware components of the healthy home, step 807. The graphical illustrations include animation of characteristics of the graphical illustrations according to determined system operating status, step 808. In an embodiment, the graphical illustration includes an illustration of a building structure. In a specific embodiment, the graphical illustration includes an illustration of a solar array coupled to the building structure, where the illustration is configured to at least two states. The states can include a first state, being a non-operative state, and a second state, being an operative state configured by an animating characteristic of the illustration of the solar array. In an embodiment the animation characteristic is selected from at least a change in color or a change in spatial shape of the graphical illustration.

In a specific embodiment, the user display includes a graphical illustration of the electric panel, the heating system, the water heating, as well as other healthy home elements. In an embodiment, the same animation characteristic applied to the solar array can be applied to these respective elements. The animation for each hardware element can be a variety of effects, including but not limited to, color and gradient changes, moving components of the graphical illustration, as well as others. In a specific embodiment, different animations are associated with the working or disabled status of each of the hardware components of the healthy home system. The animations can be color-coded for easy distinction between each of the components within the graphical illustration of the healthy home. Again, there can be many other variations, modifications, and alternatives.

Once the first cycle of a diagnostic check, validation, and animation display is conducted, the process of updating system information is conducted through a scheduling scheme, step 809, according to an embodiment of the present invention. In an embodiment, this cycle of steps described herein is run on a regular basis according to a specified time interval until the healthy home graphical user interface is closed by the user, or the associated computer terminal or computing system has lost power. In another embodiment, the scheduling may be done through an interrupt scheme wherein signals are sent to the user interface when a significant change in the associated hardware has been detected. Once the update has occurred, the graphical user interface is refreshed to display the current data, step 810. Once again, there can be many other variations modifications, and alternatives.

The above sequence of processes provides a method for initializing and refreshing the graphical illustration panel of the graphical user interface for the healthy home according to an embodiment of the present invention. As shown, the method uses a combination of steps including establishing connections with associated hardware, running diagnostic checks for system health, validating data retrieved, and displaying the appropriate animation associated with the current system health. Other alternatives can also be provided where steps are added, one or more steps are removed, or one or more steps are provided in a different sequence without departing from the scope of the claims herein. Further details of the present method can be found throughout the present specification and more particularly below.

Figure 8B:
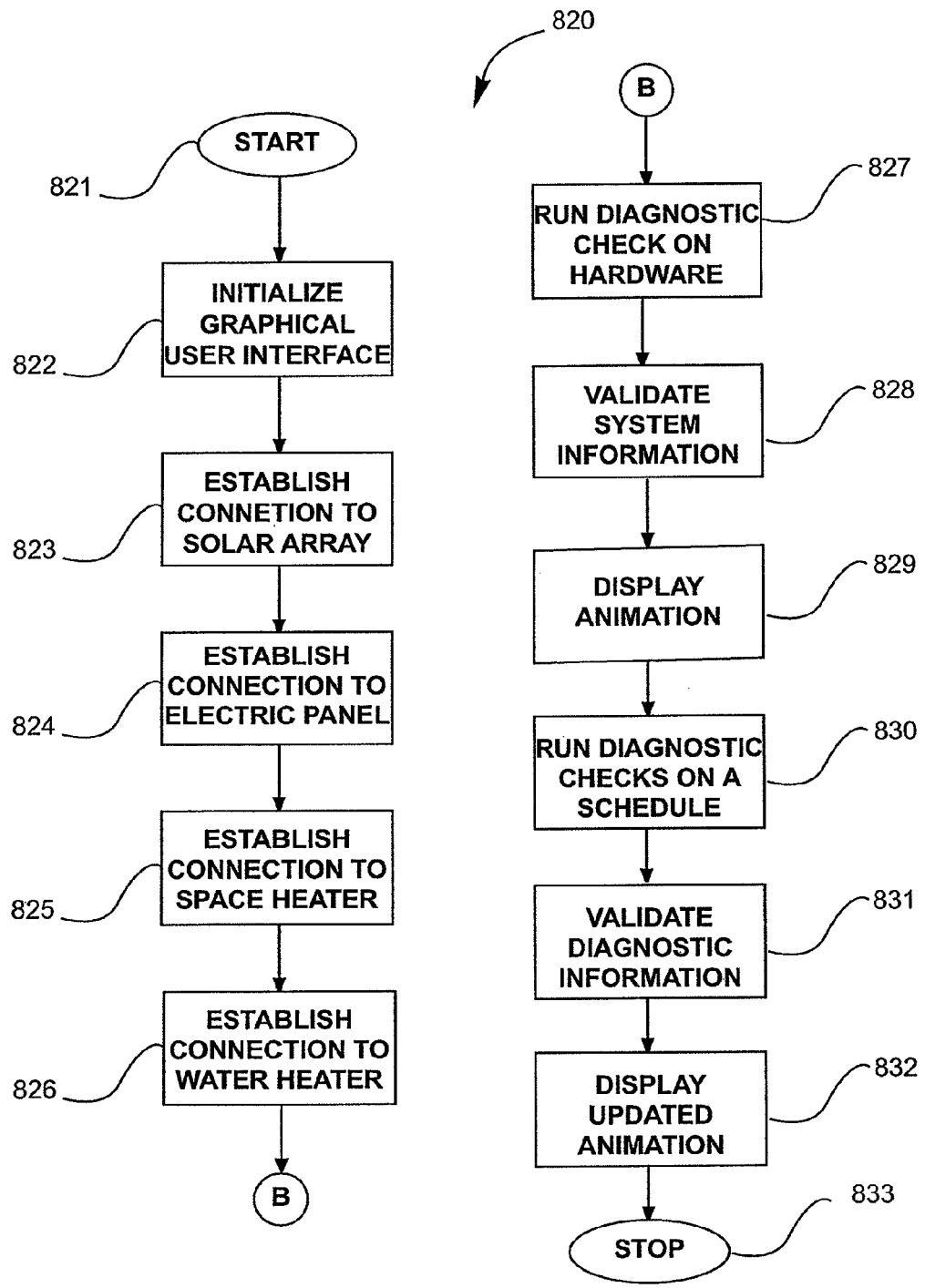

As shown in FIG. 8B, the present method can be briefly outlined below.

1. Start;
2. Initialize healthy home graphical user interface;
3. Establish connection with solar array;
4. Establish connection with electric panel;
5. Establish connection with space heater;
6. Establish connection with water heater;
7. Run diagnostic check on established hardware to determine operative status;
8. Validate operative status of established hardware;
9. Display animation on graphical illustration associated with healthy home system status;
10. Run diagnostic checks on established hardware according to a specified scheduling scheme to determine healthy home system status;
11. Validate information received from diagnostic checks according to the specified scheduling scheme;
12. Display associated animation according to validated status according to the scheduling scheme; and
13. Stop These steps are merely examples and should not unduly limit the scope of the claims herein. As shown, the above method provides a way of initializing the graphical illustration panel of the graphical user interface for the healthy home according to an embodiment of the present invention. In a preferred embodiment, the method first initializes the user interface, continues to run periodic diagnostic checks to determine system status and consequently updates the graphical illustration to display the animation associated with the current system status. One of ordinary skill in the art would recognize many other variations, modifications, and alternatives. For example, various steps outlined above may be added, removed, modified, rearranged, repeated, and/or overlapped, as contemplated within the scope of the invention.

The above sequence of processes provides a method for initializing and refreshing the graphical illustration panel of the graphical user interface for the healthy home according to an embodiment of the present invention. As shown, the method uses a combination of steps including establishing connections with associated hardware, running diagnostic checks for system health, validating data retrieved, and displaying the appropriate animation associated with the current system health. Other alternatives can also be provided where steps are added, one or more steps are removed, or one or more steps are provided in a different sequence without departing from the scope of the claims herein. Further details of the present method can be found throughout the present specification and more particularly below.

As shown in FIG. 8B, the method 820 begins at start, step 821. The present method provides an initialization method for determining the operative status of the healthy home system according to an embodiment of the present invention. Determining the operative status of all associated hardware in the healthy home is useful from the vantage of not only maintenance (e.g. whether the system is broken or needs repairs), but also from the accessibility and fine tuning of the healthy home parameters according to user preferences (establishing custom settings for healthy home operation through user input). Here, the method begins at a personal computer, computing system, or any system capable of running the healthy home graphical user interface, establishing connection to the healthy home system, access stored information about system performance, and receiving user input through a user input device, such as a mouse, keyboard, and others.

The healthy home graphical user interface begins the initialization of the graphical illustration panel by first initializing the graphical user interface for the healthy home, step 822. The user interface can be initialized on any personal computer, computing system, or computing device that can run the user interface program, display the graphical contents, and accept user inputs through an input device, such as a mouse, keyboard, and the like. The initialization process is followed by a series of system checks to establish the working status of the associated hardware within the healthy home system. First, an acknowledgement signal is sent to a controller to establish the working status of the solar modules, step 823. The controller can send an acknowledgement back to the user interface in the case of an established connection, or in the case an off-status or error, a timeout response can be generated in the absence of a returned acknowledgement signal. A warning message may also be displayed in the user interface to alert the user to the current disabled status and prompt the user for further action. One skilled in the art would recognize many other variations, modifications, and alternatives.

A similar acknowledgement signal is sent to the controller to determine the working status of the electric panel, step 824, the space heater, step 825, and the water heater, step 826. In a specific embodiment, the controller can transmit an acknowledgement signal back to the user interface to establish that each of the associated system hardware is operational. In another embodiment, additional information may be transmitted during this phase to provide additional basic status information about the associated hardware for general maintenance purposes. The additional information may be used for more detailed alerts and notifications to be displayed in the user interface for the user and provide additional prompts for the user to determine the next course of action.

Once the associated hardware has been established, a diagnostic check is run on all associated hardware to determine detailed information about the operative status of the healthy home system, step 827. Additional acknowledgement or system signals can be sent to the controller for the healthy home to retrieve additional information, such as related thermal and electrical information, energy production information, and the like. The diagnostics are then validated to check for consistency of the acquired system information, step 828. Data validation can occur through a variety of methods, such as comparing the diagnostic values to theoretical data, to other healthy home systems in the local area, or any other like method of comparison. In a specific embodiment, the validation of the system operation can include cross-checking the operative status of all associated hardware by comparing relative production of energy or other operative values. Of course, there can be many other variations, modifications, and alternatives.

The validated diagnostic data is used to display an animation of working status associated with each of the hardware components of the healthy home, step 829. The animation for each hardware element can be a variety of effects, including but not limited to, color and gradient changes, moving components of the graphical illustration, as well as others. In a specific embodiment, different animations are associated with the working or disabled status of each of the hardware components of the healthy home system. The animations can be color-coded for easy distinction between each of the components within the graphical illustration of the healthy home. Again, there can be many other variations, modifications, and alternatives.

Once the first cycle of a diagnostic check, validation, and animation display is conducted, the process of periodically rerunning diagnostic checks, step 830, validating the diagnostic information, step 831, and updating the animation of the graphical illustration of the associated hardware of the healthy home, step 832, is conducted through a scheduling scheme according to an embodiment of the present invention. In an embodiment, this cycle of steps described herein is run on a regular basis according to a specified time interval until the healthy home graphical user interface is closed by the user, or the associated computer terminal or computing system has lost power. In another embodiment, the scheduling may be done through an interrupt scheme wherein signals are sent to the user interface when a significant change in the associated hardware has been detected. Once again, there can be many other variations modifications, and alternatives.

The above sequence of processes provides a method for initializing and refreshing the graphical illustration panel of the graphical user interface for the healthy home according to an embodiment of the present invention. As shown, the method uses a combination of steps including establishing connections with associated hardware, running diagnostic checks for system health, validating data retrieved, and displaying the appropriate animation associated with the current system health. Other alternatives can also be provided where steps are added, one or more steps are removed, or one or more steps are provided in a different sequence without departing from the scope of the claims herein. Further details of the present method can be found throughout the present specification and more particularly below.

Figure 8C:
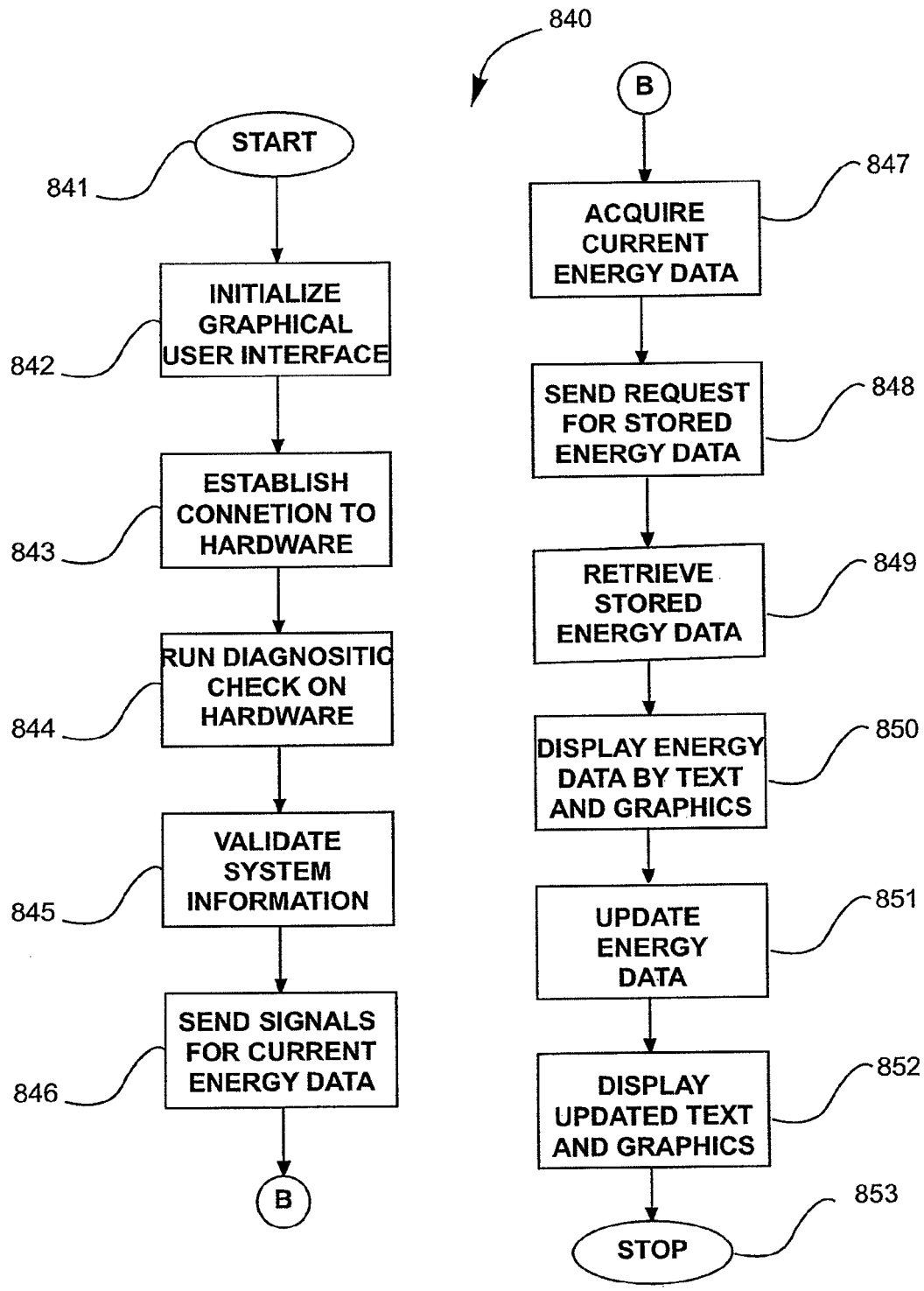

As shown in FIG. 8C, the present method can be briefly outline below.

1. Start;
2. Initialize healthy home graphical user interface;
3. Establish connection with hardware associated with the healthy home system;
4. Run diagnostic check on established hardware to determine operative status;
5. Validate operative status of established hardware;
6. Send control signals to the controller to retrieve energy production data related to current energy production rate;
7. Acquire current energy production data;
8. Send request to local database to retrieve stored energy production history data;
9. Retrieve stored energy production history data;
10. Display associated energy production information in the energy production display panels of the healthy home graphical user interface;
11. Update energy production information according to a specified scheduling scheme;
12. Display update energy production information in the healthy home graphical user interface according to the scheduling scheme; and
13. Stop.

These steps are merely examples and should not unduly limit the scope of the claims herein. As shown, the above method provides a way of initializing energy production display panels of the graphical user interface for the healthy home according to an embodiment of the present invention. In a preferred embodiment, the method first initializes the user interface, runs diagnostic checks on associated hardware of the healthy home, retrieves information about energy production and all related energy data, and then displays all related information within designated panels of the user interface. One of ordinary skill in the art would recognize many other variations, modifications, and alternatives. For example, various steps outlined above may be added, removed, modified, rearranged, repeated, and/or overlapped, as contemplated within the scope of the invention.

As shown in FIG. 8C, the method 840 begins at start, 841. The present method provides a way of initializing energy production display panels of the graphical user interface for the healthy home according to an embodiment of the present invention. The energy production display panels contain useful information about current and past thermal and electrical energy of the healthy home to keep the user well-informed and secure about the operation of his/her healthy home. The energy production information collected may also be used to apply for rebate programs and other monetary incentive programs. Here, the method begins at a personal computer, computing system, or any system capable of running the healthy home graphical user interface, establishing connection to the healthy home system, access stored information about system performance, and receiving user input through a user input device, such as a mouse keyboard, and others.

The healthy home graphical user interface begins the initialization of the addition display panels by first initializing the graphical user interface for the healthy home, step 842. The user interface can be initialized on any personal computer, computing system, or computing device that can run the interface program, display the graphical contents, and accept user inputs through an input device, such as a mouse, keyboard, and the like. The initialization process is followed by a series of system checks to establish the working status of the associated hardware within the healthy home system, step 843. This can be conducted according the embodiments of the present invention described above. One skilled in the art would recognize many other variations, modifications, and alternatives.

Once the associated hardware has been established, a diagnostic check is run on all associated hardware to determine detailed information about the operative status of the healthy home system, step 844. Addition acknowledgment or system signals can be sent to the controller for the healthy home to retrieve additional information, such as related thermal and electrical information, energy production information, and the like. The diagnostics are then validated to check for consistency of the acquired system information, step 845. Data validation can occur through a variety of methods, such as comparing the diagnostic values to theoretical data, to other healthy home systems in the local area, or any other like method of comparison. In a specific embodiment, the validation of system operation can include cross-checking the operative status of all associated hardware by comparing relative production of energy or other operative values. Of course, there can be many other variations, modifications, and alternatives.

Once the operative status of the associated hardware has been validated, control signals are sent to the controller to retrieve the current energy production rate, step 846. Additional acknowledgement or system signals can be sent to the controller for the healthy home to retrieve additional information, such as related current heating and electrical energy production parameters. After the controller receives the control signals, the controller sends the current energy production information back to the user interface, step 847. After the current energy production information has been displayed, a request signal is sent to a local database to retrieve stored energy production history data, step 848. The energy production history data is then retrieved for use in the graphical user display, step 849. In a specific embodiment, the local database can include a ROM, a flash memory, a hard drive, and the like, that is used in conjunction with the computing system running the healthy home user interface. In another embodiment, the local database can be accessed through the internet, or any communication network. The energy production history data can include cumulative totals of energy produced, total heating energy produced, total electrical energy produced, total cooling energy produced, as well as others. Of course, there can be many variations, modifications, and alternatives.

One all associated information related to energy production has been retrieved, the current energy production information is displayed in the current energy production display panel, and the energy production history information is displayed in the energy production history display panel, step 850. The energy production information can be displayed in a variety of ways, including a text format, a diagram, a histogram, and the like.

Once the all associated data has been displayed in the healthy home graphical user interface, the energy production information is updated according to a specified time schedule, step 851, according to an embodiment of the present invention. After each update, the related information is then displayed in the associated energy production display panel, step 852. In an embodiment, this cycle of steps described herein is run on a regular basis according to a specified time interval until the healthy home graphical user interface is closed by the user, or the associated computer terminal or computing system has lost power. In another embodiment, the scheduling may be done through an interrupt scheme wherein signals are sent to the user interface when a significant change in the associated hardware has been detected. Once again, there can be many other variations modifications, and alternatives.

The above sequence of processes provides a method for initializing and refreshing the energy production display panels of the graphical user interface for the healthy home according to an embodiment of the present invention. As shown, the method uses a combination of steps including establishing connections with associated hardware, running diagnostic checks for system health, validating data retrieved, retrieving associated energy production information, and displaying the appropriate data associated with the current system performance. Other alternatives can also be provided where steps are added, one or more steps are removed, or one or more steps are provided in a different sequence without departing from the scope of the claims herein. Further details of the present method can be found throughout the present specification and more particularly below.

Figure 8D:
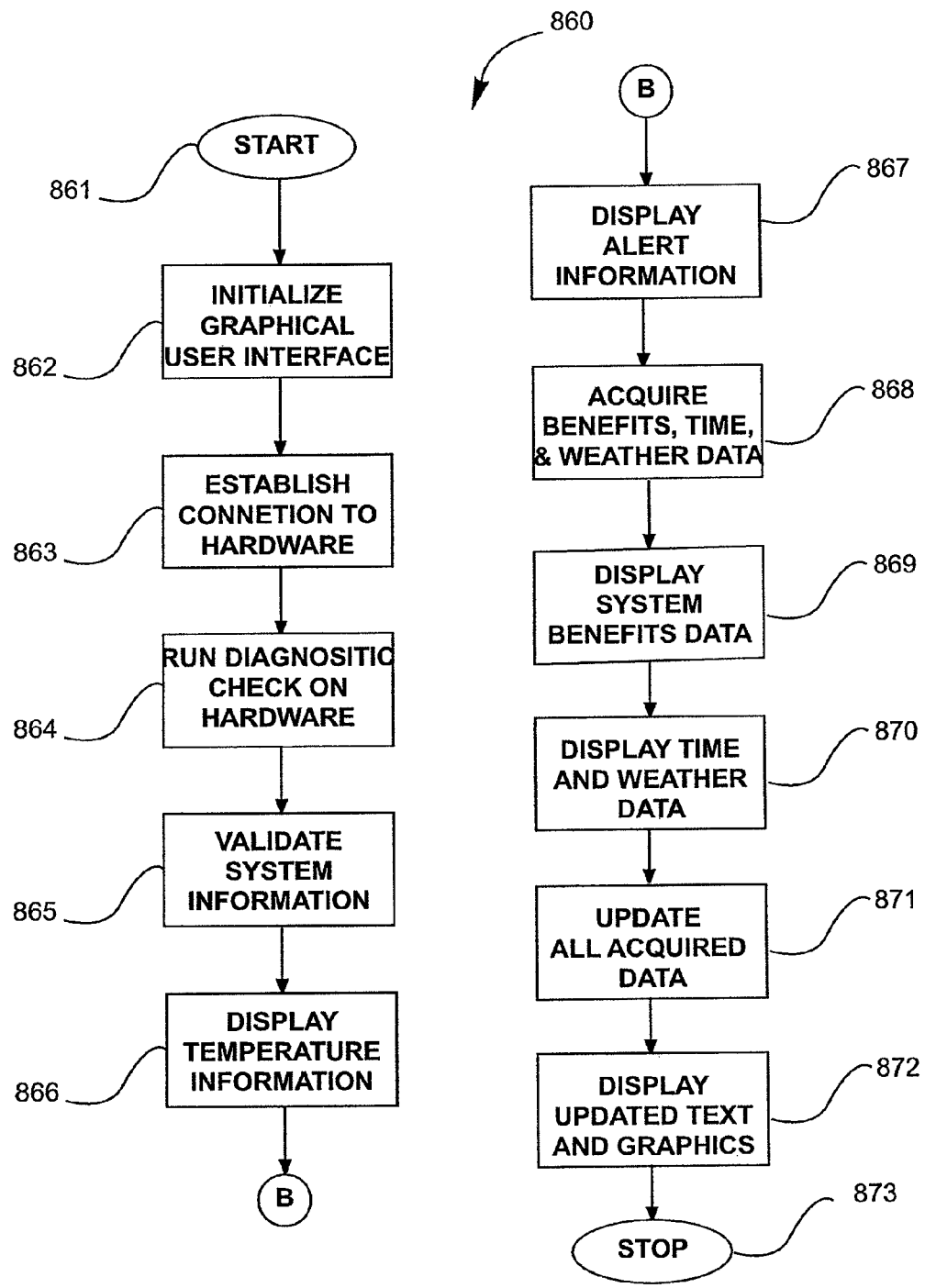

As shown in FIG. 8D, the present method can be briefly outline below.
1. Start;
2. Initialize healthy home graphical user interface;
3. Establish connection with hardware associated with the healthy home system;
4. Run diagnostic check on established hardware to determine operative status;
5. Validate operative status of established hardware;
6. Display associated temperature information in the temperature display panel of the healthy home graphical user interface;

7. Display associated messages and system options in alerts/notifications display panel of the healthy home graphical user interface;
8. Acquire system benefits, weather, and time information from local server database;
9. Display associated information about system benefits in the system benefits display panel of the healthy home graphical user interface;
10. Display time and weather information in the weather display panel and toolbars in the healthy home graphical user interface;
11. Update system, time, and weather information according to a specified scheduling scheme;
12. Display updated system, time and weather information in the healthy home graphical user interface according to the scheduling scheme; and
13. Stop.

These steps are merely examples and should not unduly limit the scope of the claims herein. As shown, the above method provides a way of initializing additional display panels of the graphical user interface for the healthy home according to an embodiment of the present invention. In a preferred embodiment, the method first initializes the user interface, runs diagnostic checks on associated hardware of the healthy home, retrieves information about energy production, retrieves information about system updates and local weather, and then displays all related information within designated panels of the user interface. One of ordinary skill in the art would recognize many other variations, modifications, and alternatives. For example, various steps outlined above may be added, removed, modified, rearranged, repeated, and/or overlapped, as contemplated within the scope of the invention.

As shown in FIG. 8D, the method 860 begins at start, step 861. The present method provides a way of initializing additional display panels of the graphical user interface for the healthy home according to an embodiment of the present invention. Additional display panels containing information about new updates, notifications, and alerts keep the user well-informed and secure about the operation of his/her healthy home. Here, the method begins at a personal computer, computing system, or any system capable of running the healthy home graphical user interface, establishing connection to the healthy home system, access stored information about system performance, and receiving user input through a user input device, such as a mouse, keyboard, and others.

The healthy home graphical user interface begins the initialization of the addition display panels by first initializing the graphical user interface for the healthy home, step 862. The user interface can be initialized on any personal computer, computing system, or computing device that can run the interface program, display the graphical contents, and accept user inputs through an input device, such as a mouse, keyboard, and the like. The initialization process is followed by a series of system checks to establish the working status of the associated hardware within the healthy home system, step 863. This can be conducted according the embodiments of the present invention described above. One skilled in the art would recognize many other variations, modifications, and alternatives.

Once the associated hardware has been established, a diagnostic check is run on all associated hardware to determine detailed information about the operative status of the healthy home system, step 864. Addition acknowledgment or system signals can be sent to the controller for the healthy home to retrieve additional information, such as related thermal and electrical information, energy production information, and the like. The diagnostics are then validated to check for consistency of the acquired system information, step 865. Data validation can occur through a variety of methods, such as comparing the diagnostic values to theoretical data, to other healthy home systems in the local area, or any other like method of comparison. In a specific embodiment, the validation of system operation can include cross-checking the operative status of all associated hardware by comparing relative production of energy or other operative values. Of course, there can be many other variations, modifications, and alternatives.

The validated diagnostic data is used to display the associated information within each of the additional display panels of the healthy home user interface. Information retrieved can be used to display related temperature information in the temperature display panel, step 866. In a specific embodiment, the temperature information can include information about the indoor temperature or room temperatures of inner space of the healthy home, the outside temperature of the target location of the healthy home, the water temperature of the healthy home water system, as well as others.

Information retrieved can also be used to display associated messages and system options in alerts/notifications display panel, step 867 of the healthy home graphical user interface. In a specific embodiment, the related information can include prompts enable additional system settings for the healthy home, such as enabling "nighttime cooling", "maximizing energy production", as well as others. Additional prompts can include a View History prompt that provides the user with a past record of all alerts and notifications displayed since the first operation of the healthy home interface. Again, there can be many variations, modifications, and alternatives.

As shown in step 868, related system benefits, weather, and time information as acquired from a local server database through internet access, and the like. In an embodiment, weather and time information can be retrieved from any standardized commercial server available. Weather and time information can include weather forecast information, standard time information with global time zone options, sunrise and sunset times, and the like. System benefits information can be retrieved from a local server established for monitoring the operation of all healthy home systems within a target region, county, country, or any other designated area. In a specific embodiment, the related system benefits information can include the number of homes powered by the healthy home system, the number of cars removed due to energy savings, as well as others. After acquisition of the related information, the information can then be displayed in the system benefits display panel, step 869, as well as the weather display panel, step 870, of the healthy home user interface. In a specific embodiment, the information may be displayed as text, as a graphical representation, or any other like method of displaying data. Of course, there can be many variations, modifications, and alternatives.

Once the all associated data has been displayed in the healthy home graphical user interface, the system, time, and weather information is updated according to a specified time schedule, step 871, according to an embodiment of the present invention. After each update, the related information is then displayed in the associated display panel, tool bar, or designated area, step 872. In an embodiment, this cycle of steps described herein is run on a regular basis according to a specified time interval until the healthy home graphical user interface is closed by the user, or the associated computer terminal or computing system has lost power. In another embodiment, the scheduling may be done through an interrupt scheme wherein signals are sent to the user interface when a significant change in the associated hardware has been detected. Once again, there can be many other variations modifications, and alternatives.

The above sequence of processes provides a method for initializing and refreshing the additional display panels of the graphical user interface for the healthy home according to an embodiment of the present invention. As shown, the method uses a combination of steps including establishing connections with associated hardware, running diagnostic checks for system health, validating data retrieved, and displaying the appropriate animation associated with the current system health. Other alternatives can also be provided where steps are added, one or more steps are removed, or one or more steps are provided in a different sequence without departing from the scope of the claims herein. Further details of the present method can be found throughout the present specification and more particularly below.

Figure 8E:
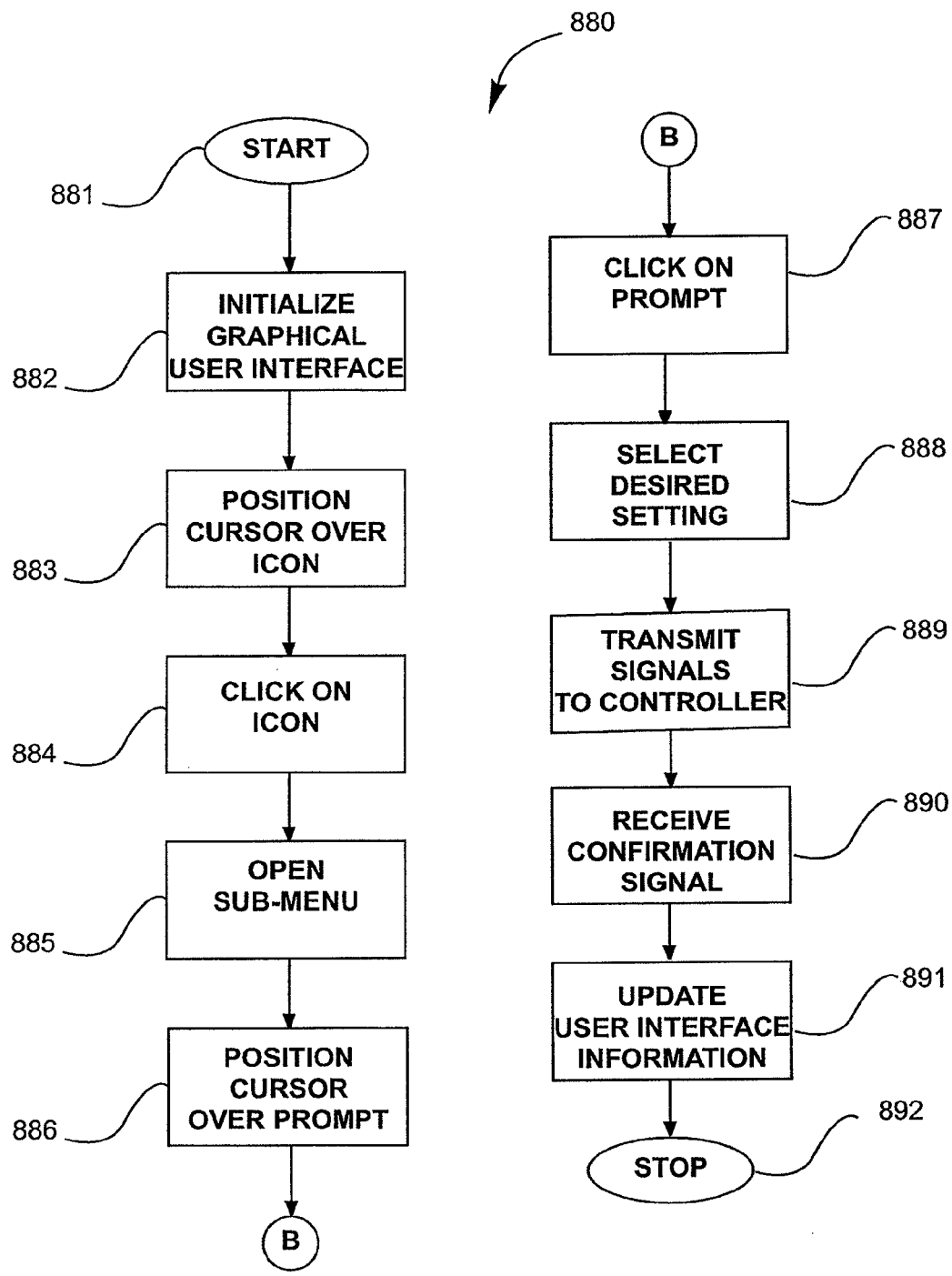

As shown in FIG. 8E, the present method can be briefly outline below.
1. Start;
2. Initialize healthy home graphical user interface;
3. Position cursor over icon or prompt associated with a particular sub-menu for changing system settings;
4. Click on icon associated with the particular sub-menu;
5. Open particular sub-menu with associated prompts for system control;
6. Position cursor over icon associated with a specific system control element to be changed by the user;
7. Click on icon or prompt associated with the specific system control element icon;
8. Select desired setting or parameter for the specific control element;
9. Transmit signals to the controller to change the associated settings within the healthy home system hardware;
10. Receive confirmation signal from the controller to the user interface that required changes have been completed;
11. Update user interface to display current information about the healthy home after the system settings have been changed; and
12. Stop.

These steps are merely examples and should not unduly limit the scope of the claims herein. As shown, the above sequence of steps provides a process for navigating and changing system settings according to user preference through the graphical user interface for the healthy home according to an embodiment of the present invention. In a preferred embodiment, the method first initializes the user interface, runs diagnostic checks on associated hardware of the healthy home, retrieves information about energy production, retrieves information about system updates and local weather, and then displays all related information within designated panels of the user interface. One of ordinary skill in the art would recognize many other variations, modifications, and alternatives. For example, various steps outlined above may be added, removed, modified, rearranged, repeated, and/or overlapped, as contemplated within the scope of the invention.

As shown in FIG. 8E, the method 880 begins at start, step 881. The present method provides a process for navigating and changing system settings according to user preference through the through the graphical user interface for the healthy home according to an embodiment of the present invention. Customizability is an important aspect of the healthy home system to ensure customer satisfaction and to provide control over aspects of the healthy home for purposes of health, monetary savings, as well as others. Here, the method begins at a personal computer, computing system, or any system capable of running the healthy home graphical user interface, establishing connection to the healthy home system, access stored information about system performance, and receiving user input through a user input device, such as a mouse, keyboard, and others.

Navigation of the healthy home user interface begins with the initialization of the graphical user interface program, step 882. The user interface can be initialized on any personal computer, computer system, or computing device that can run the user interface program, display the graphical contents, and accept user inputs through an input device, such as a mouse, keyboard, and the like. The initialization process is followed by the user positioning the cursor over an icon or prompt associated with a particular sub-menu of the system settings or control panel that the user desires to modify, step 883. The icon or prompt can include a variety of images and/or text links that direct the user to another window including a plurality of settings modify. In a specific embodiment, prompts displayed within the healthy home graphical user interface can include those such as Energy Production, Weather, Environmentals, Temperature Profiles, Settings, as well as additional prompts associated with each display panel of the main window to expand or load another window with more detailed information and associated settings, or others. One skilled in the art would recognize many variations, modifications, and alternatives.

Once the desired icon or prompt has been decided upon by the user and the cursor has been placed over the respective icon or prompt, the user then clicks the icon or prompt, step 884, to open the desired sub-menu, step 885, with associated prompts for controlling specific desired aspects of the healthy home. In an embodiment, the opening of the specified sub-menu can include loading an entirely new window with a different set of display panels, prompts, or icons, to determine the healthy home system settings. In another embodiment, the opening of the specified sub-menu can include opening a window within the main menu and can include the ability to position the sub-menu window anywhere in front of the main menu. Additionally, multiple sub-menus can be opened in front the main menu for ease of comparing settings between different system aspects for user convenience. Of course, there can be many variations, modifications, and alternatives.

After opening the desired sub-menu, the user can then position the cursor over an icon or prompt associated with a specific system control element that is to be modified, step 886. As described before, once the cursor has been placed over the desired icon or prompt, the user can click the icon or prompt, step 887, to choose a desired system setting, step 888. In a specific embodiment, the choosing of a desired system setting can include merely clicking on an icon determines a particular system setting, or a text/number field may be activated for the user to input a custom value or parameter to set the desired system setting, or additional mini-menus, control interfaces, and the like, can be accessed. Again, there can be many variations, modifications, and alternatives.

Once the desired settings have been modified, the user interface then sends the associated system signals to the controller to apply the changes to the healthy home system, step 889. These system signals can include acknowledgement signals, system information signals, control signals, and the like. Once the controller has received the system signals and changed the appropriate settings, the controller then sends an acknowledgement signal back to the user interface to signal completion, step 890. Upon completion of modifying the healthy home system, the graphical user interface is then updated to display current information about the healthy home system status, step 891. In a specific embodiment, multiple system settings may be changed simultaneously, warning signals can be sent to the user interface to notify the user of any errors, malfunctions, or difficulties in servicing the particular request made, or other processes can be included. Once again, there can be many variations, modifications, and alternatives.

The above sequence of processes provides a process for navigating and changing system settings according to user preference through the graphical user interface for the healthy home according to an embodiment of the present invention. As shown, the method uses a combination of steps including position the cursor over icons or prompts associated with desired system menus, specifying the desired parameters and settings to be modified, transmitting the signals to the controller, and display the resulting changes in the graphical user interface for the healthy home. Other alternatives can also be provided where steps are added, one or more steps are removed, or one or more steps are provided in a different sequence without departing from the scope of the claims herein. Further details of the present method can be found throughout the present specification and more particularly below.

Figure 9A:
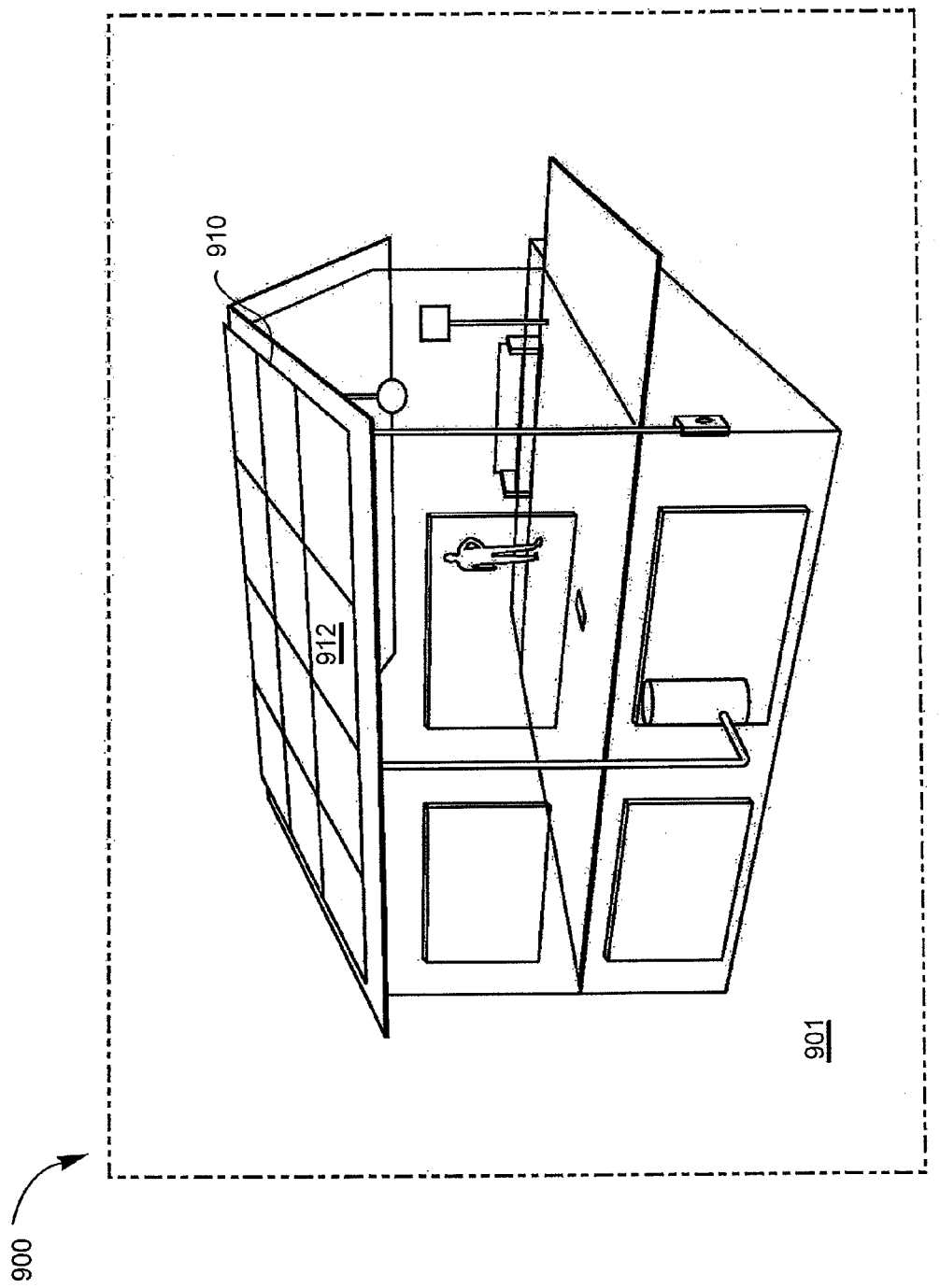
FIGS. 9A through 9C are simplified diagrams illustrating animation of a solar array for a healthy home according to an embodiment of the present invention.
Figure 9B:
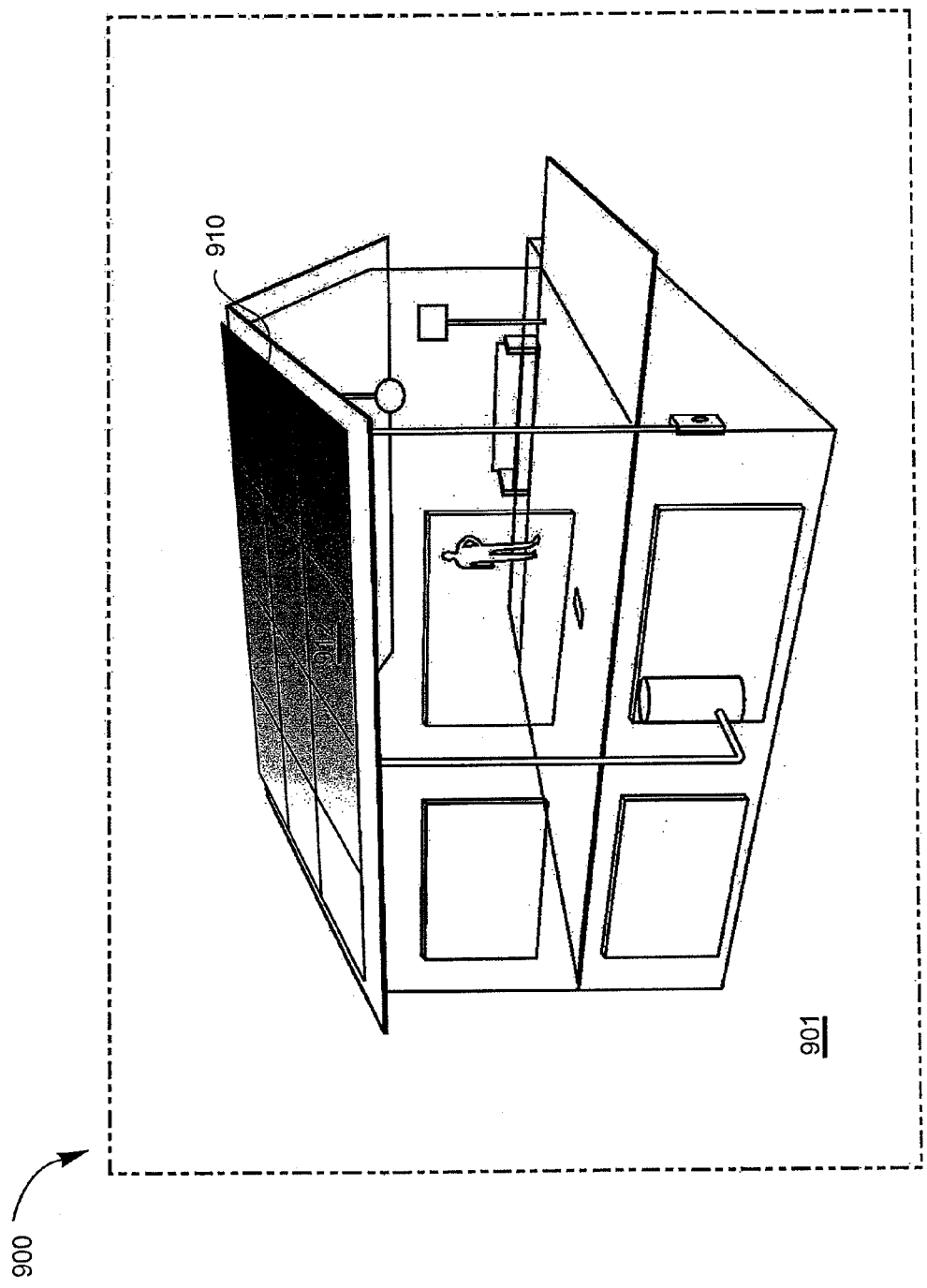
Figure 9C:
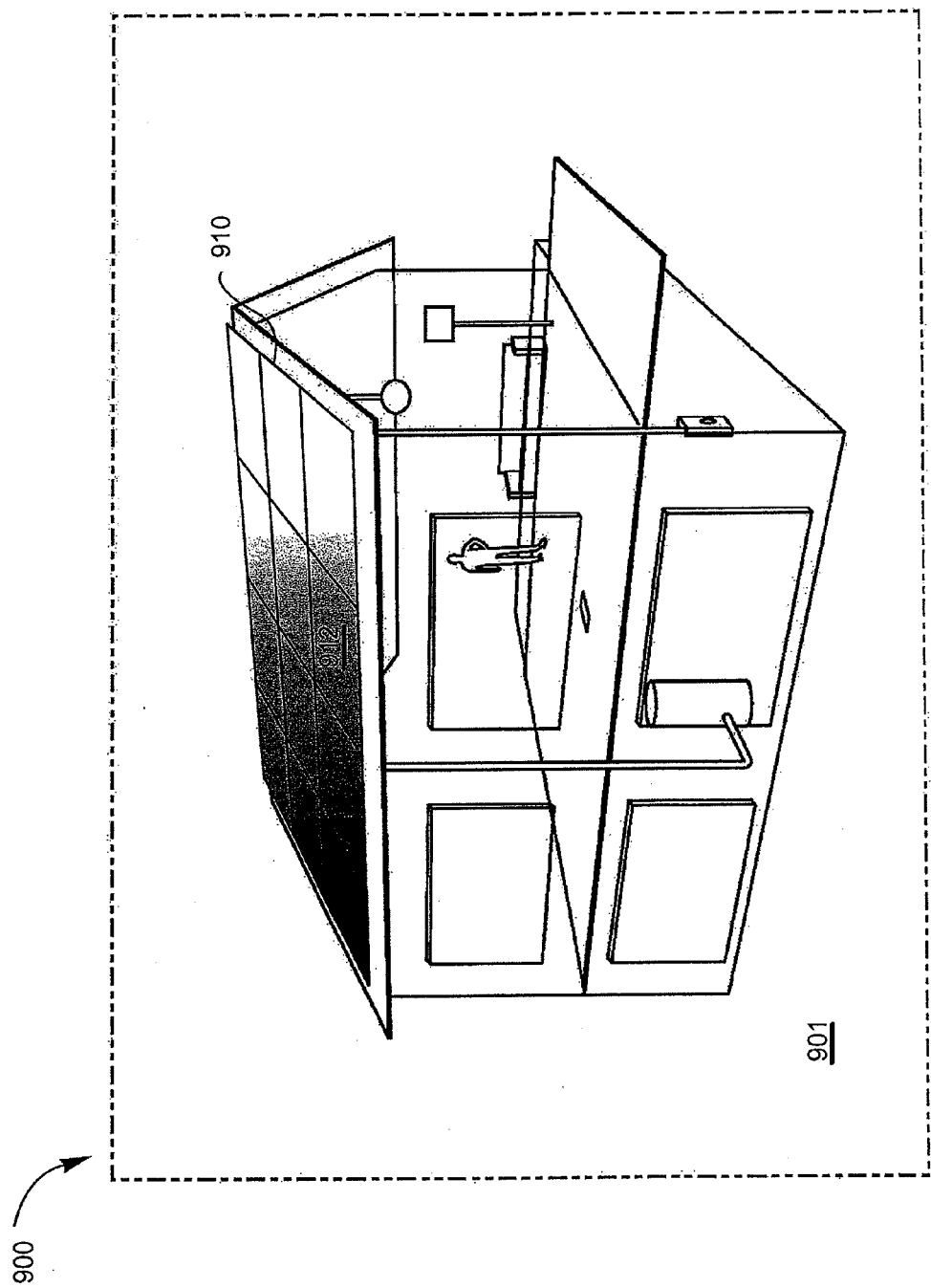

FIGS. 9A through 9C are simplified diagrams illustrating animation of a solar array for a healthy home according to an embodiment of the present invention. These diagrams are merely examples, which should not unduly limit the scope of the claims herein. One of ordinary skill in the art would recognize other variations, modifications, and alternatives. As shown in FIGS. 9A through 9C, a graphical illustration 900 includes a solar array 910 implemented at a target location 901. According to FIG. 9A, the graphical illustration 900 of a healthy home system implemented at the target location 901 shows the disabled status animation of the solar array according to an embodiment of the present invention. In a specific embodiment, the graphical illustration 900 displays the disabled status of the solar array 910 by means of a lack of animation from the solar array region 912 of the illustration 900. The disabled status of the solar array 910 can represent the off-state of the array 910 in the case of a shutdown procedure initiated from the menu system of the graphical user interface according to an embodiment of the present invention. In another embodiment, the disabled status of the solar array 910 can represent a software detection failure, or hardware detection failure, which can include associated warning notices displayed in the user interface. One skilled in the art can recognize many other variations, modifications, and alternatives.

According to FIGS. 9B and 9C, the graphical illustration 900 of a healthy home system implemented at the target location 901 shows the activated status animation of the solar array 910 according to an embodiment of the present invention. The activated status of the solar array 910 can represent the on-state of the array 910 in the case of proper operation of the healthy home solar system. In another embodiment, the activated status of the solar array 910 can represent the on-state in the case of an initialization procedure initiated from the menu system of the graphical user interface according to an embodiment of the present invention. In an embodiment, FIGS. 9B and 9C can represent different phases of the animation of the solar array for a healthy home. The animation of the solar array 910 within the array region 912 can include a variety of effects including a "traveling sun gleam" effect, moving reflection of sunlight, color and gradient effects, moving graphical components, as well as others. Of course, there can be many other variations, modifications, and alternatives.

Figure 10A:
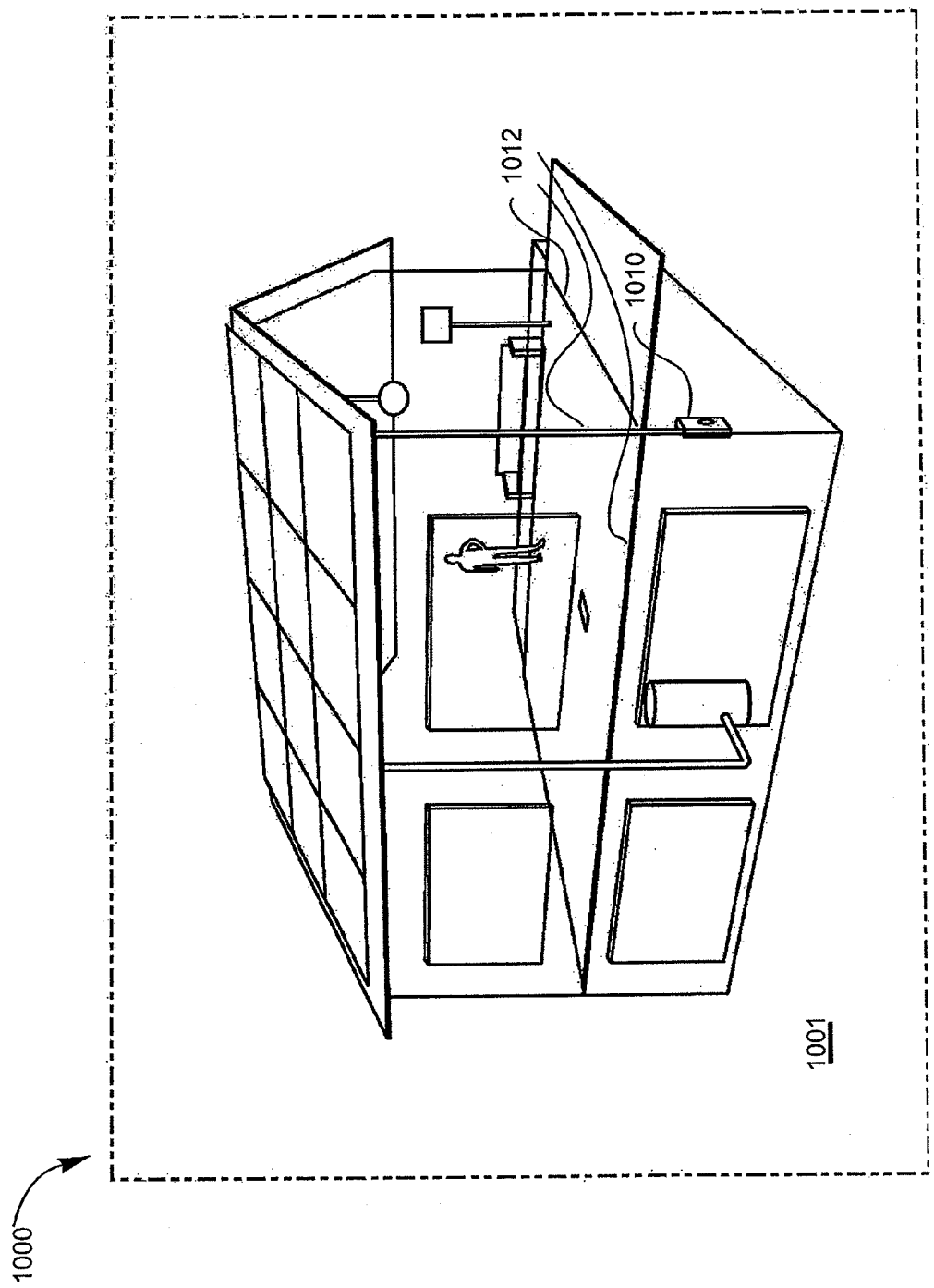
FIGS. 10A through 10C are simplified diagrams illustrating animation of an electric panel for a healthy home according to an embodiment of the present invention.
Figure 10B:
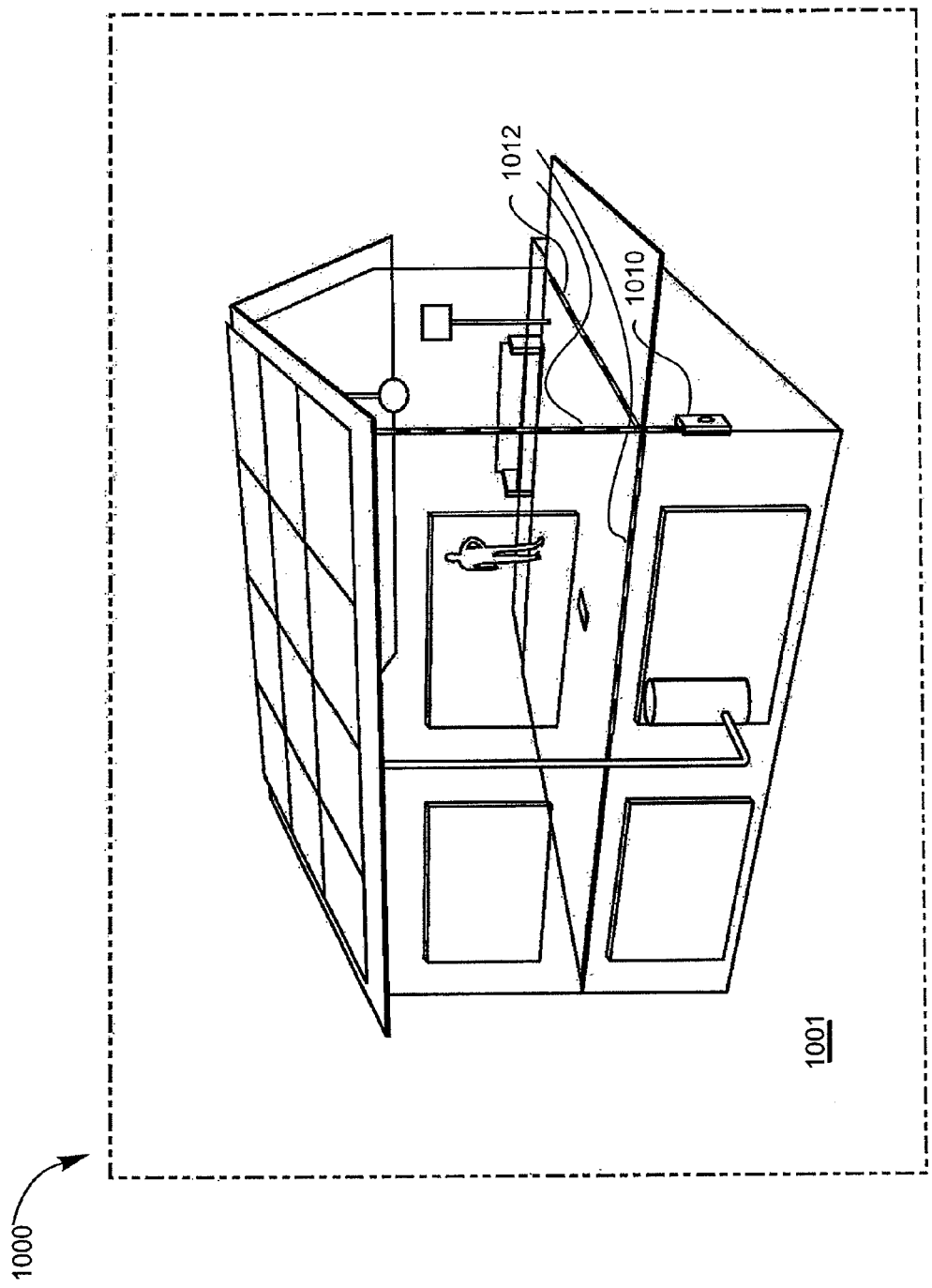
Figure 10C:
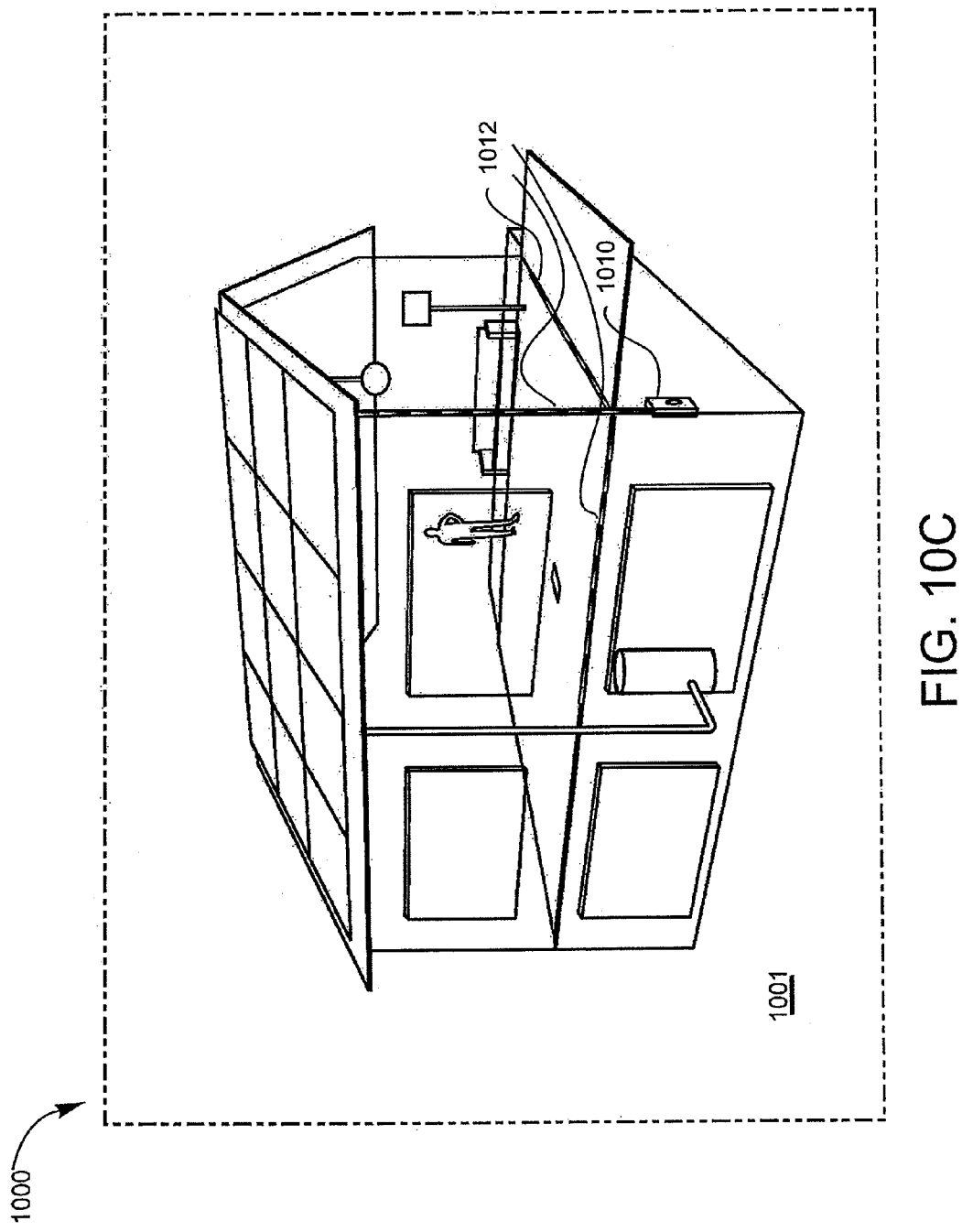

FIGS. 10A through 10C are simplified diagrams illustrating animation of an electric panel for a healthy home according to an embodiment of the present invention. These diagrams are merely examples, which should not unduly limit the scope of the claims herein. One of ordinary skill in the art would recognize other variations, modifications, and alternatives. As shown in FIG. 10A, a graphical illustration 1000 includes an electric panel 1010 and electrical conduits 1012 implemented at a target location 1001. The graphical illustration 1000 of a healthy home system implemented at the target location 1001 shows the disabled status animation of the electric panel according to an embodiment of the present invention. In a specific embodiment, the graphical illustration 1000 displays the disabled status of the electric panel 1010 by means of a lack of animation from the electric panel region 1012 of the illustration 1000. The disabled status of the electric panel 1010 can represent the off-state of the panel 1010 in the case of a shutdown procedure initiated from the menu system of the graphical user interface according to an embodiment of the present invention. In another embodiment, the disabled status of the electric panel 1010 can represent the software detection failure, or hardware detection failure, which can include associated warning notices displayed in the user interface. One skilled in the art can recognize many other variations, modifications, and alternatives.

According to FIGS. 10B and 10C, the graphical illustration 1000 of a healthy home system implemented at the target location 1001 shows the activated status animation of the electric panel 1010 according to an embodiment of the present invention. The activated status of the electric panel 1010 can represent the on-state of the panel 1010 in the case of proper operation of the healthy home electrical system. In another embodiment, the activated status of the electric panel 1010 can represent the on-state in the case of an initialization procedure initiated from the menu system of the graphical user interface according to an embodiment of the present invention. In an embodiment, FIGS. 10B and 10C can represent different phases of the animation of the electric for the healthy home. The animation of the electric panel 1010 and the electrical conduits 1012 can include a variety of effects including a "marching ants" effect, moving line segments, color and gradient effects, moving graphical components, as well as others. Of course, there can be many other variations, modifications, and alternatives.

Figure 11A:
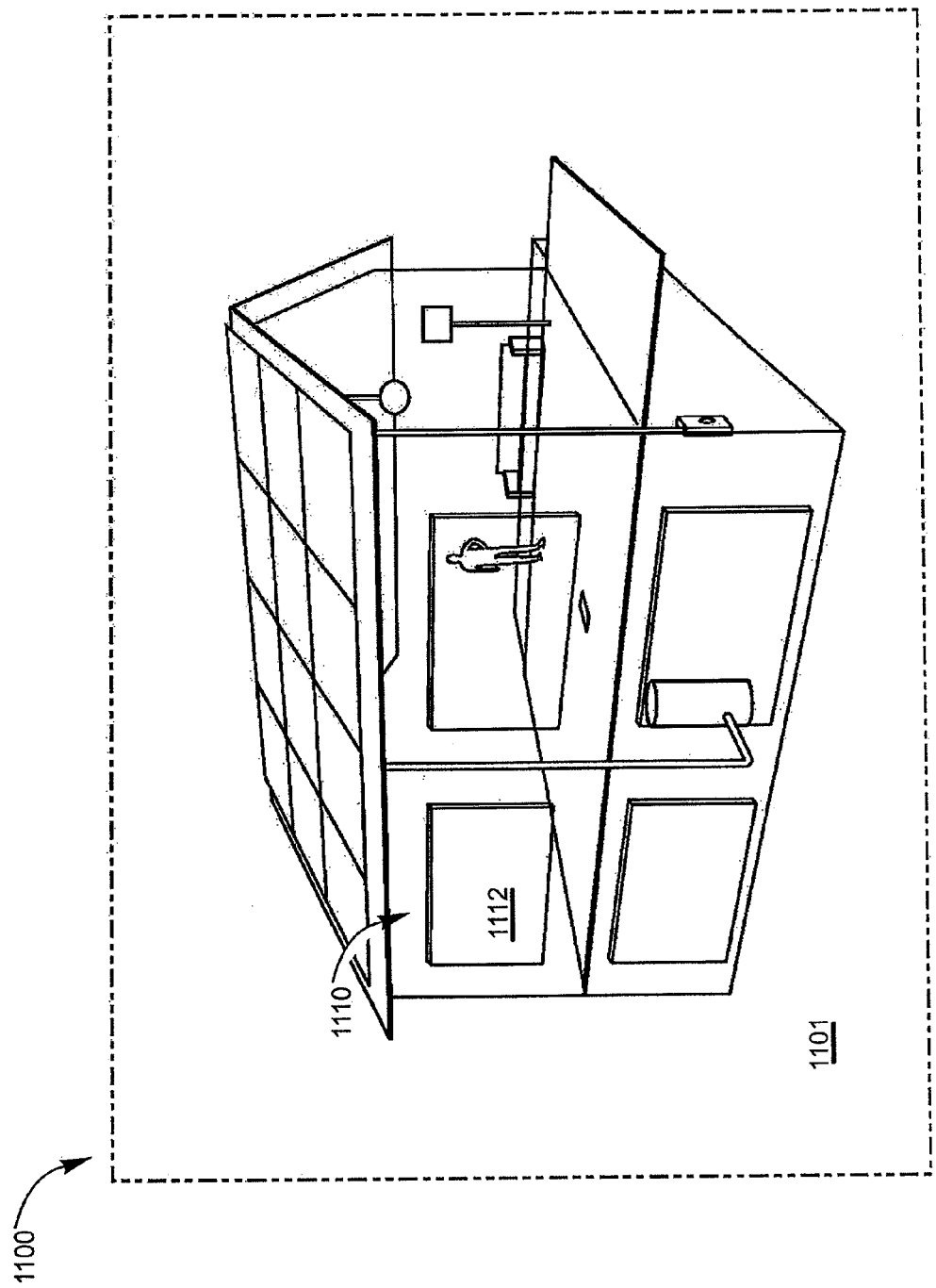
FIGS. 11A through 11C are simplified diagrams illustrating animation of a space heater for a healthy home according to an embodiment of the present invention.
Figure 11B:
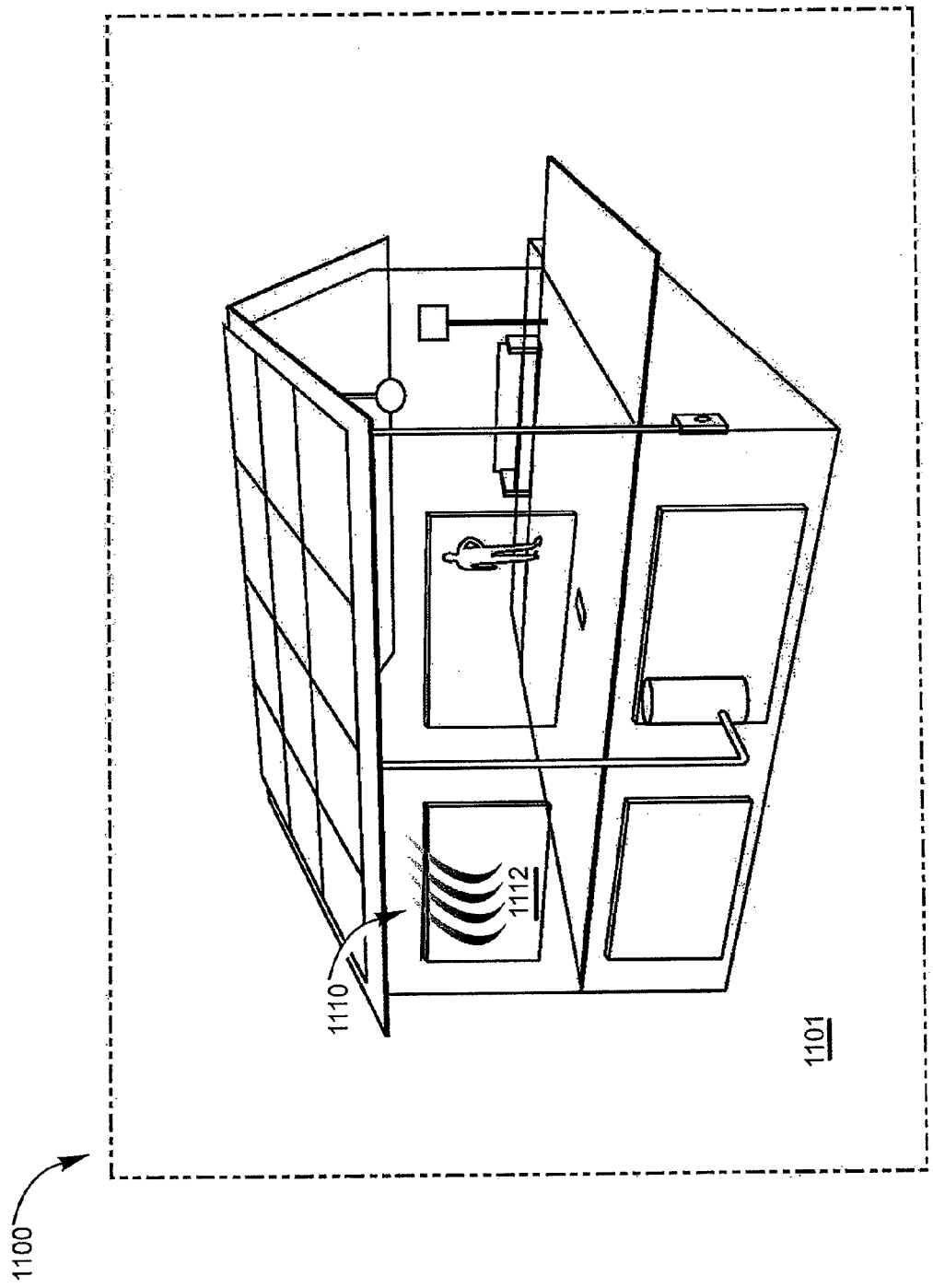
Figure 11C:
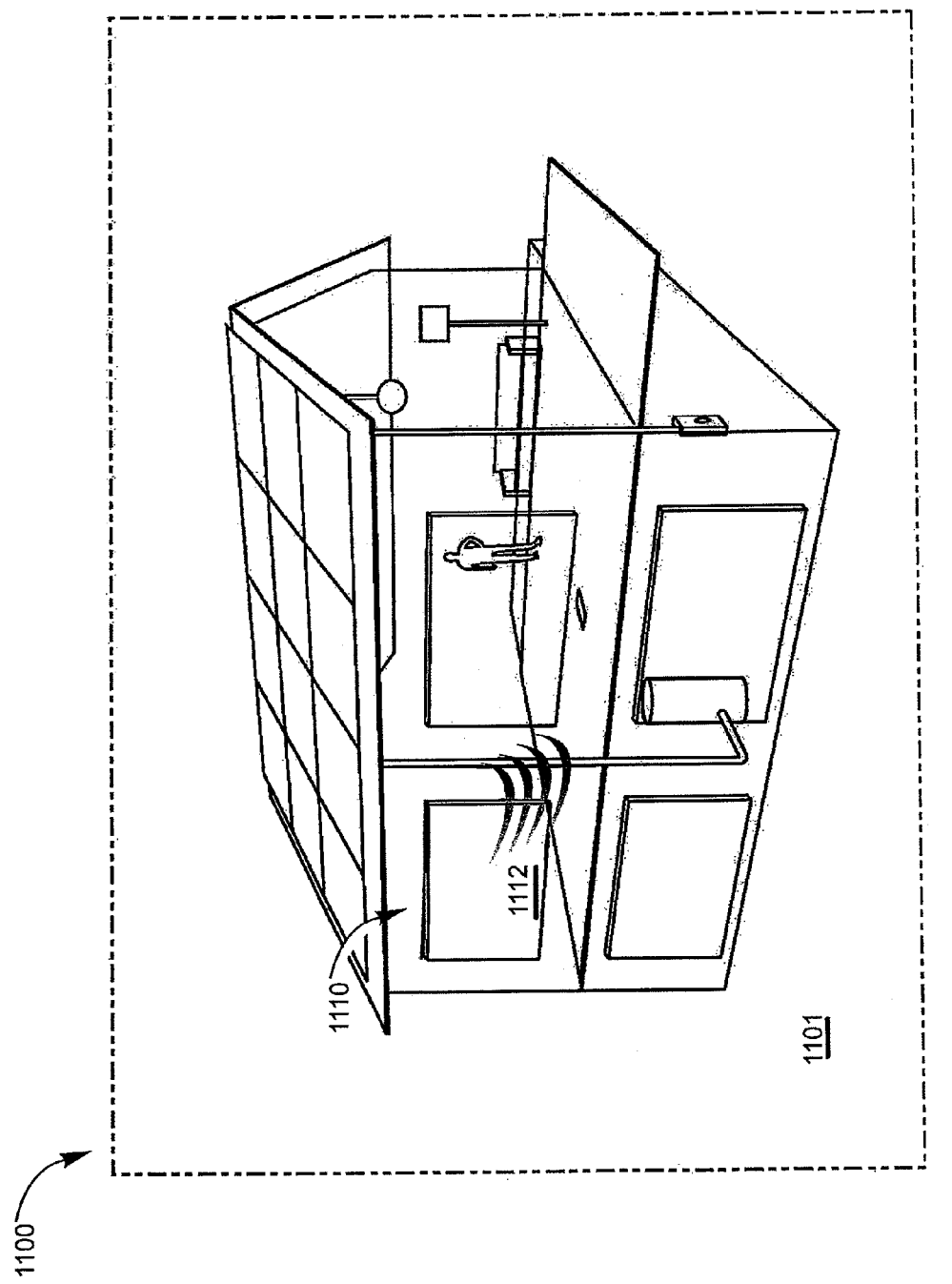

FIGS. 11A through 11C are simplified diagrams illustrating animation of a space heater for a healthy home according to an embodiment of the present invention. These diagrams are merely examples, which should not unduly limit the scope of the claims herein. One of ordinary skill in the art would recognize other variations, modifications, and alternatives. As shown in FIGS. 11A through 11C, a graphical illustration 1100 includes a space heater 1110 implemented at a target location 1101. The graphical illustration 1100 of a healthy home system implemented at a target location 1101 shows the disabled status animation of the space heater according to an embodiment of the present invention. In a specific embodiment, the graphical illustration 1100 displays the disabled status of the electric panel by means of a lack of animation from the space heater region 1112 of the illustration 1100. The disabled status can represent the off-state of the space heater according to an embodiment of the present invention. In another embodiment, the disabled status of the space heater 1110 can represent a software detection failure, or hardware detection failure, which can include associated warning notices displayed in the user interface. Of course, one skilled in the art can recognize many other variations.

According to FIGS. 11B and 11C, the graphical illustration 1100 of a healthy home system implemented at the target location 1101 shows the activated status animation of the space heater 1110 according to an embodiment of the present invention. The activated status of the space heater 1110 can represent the on-state of the heater 1110 in the case of proper operation of the healthy home solar system. In another embodiment, the activated status of the heater 1110 can represent the on-state in the case of an initialization procedure initiated from the menu system of the graphical user interface according to an embodiment of the present invention. In an embodiment, FIGS. 11B and 11C can represent different phases of the animation of the solar array for a healthy home. The animation of the space heater 1110 within the heater region 1112 can include a variety of effects including a "convection heat wave" effect, a traveling heat flow effect, color and gradient effects, moving graphical components, as well as others. Again, there can be many other variations, modifications, and alternatives.

Figure 12A:
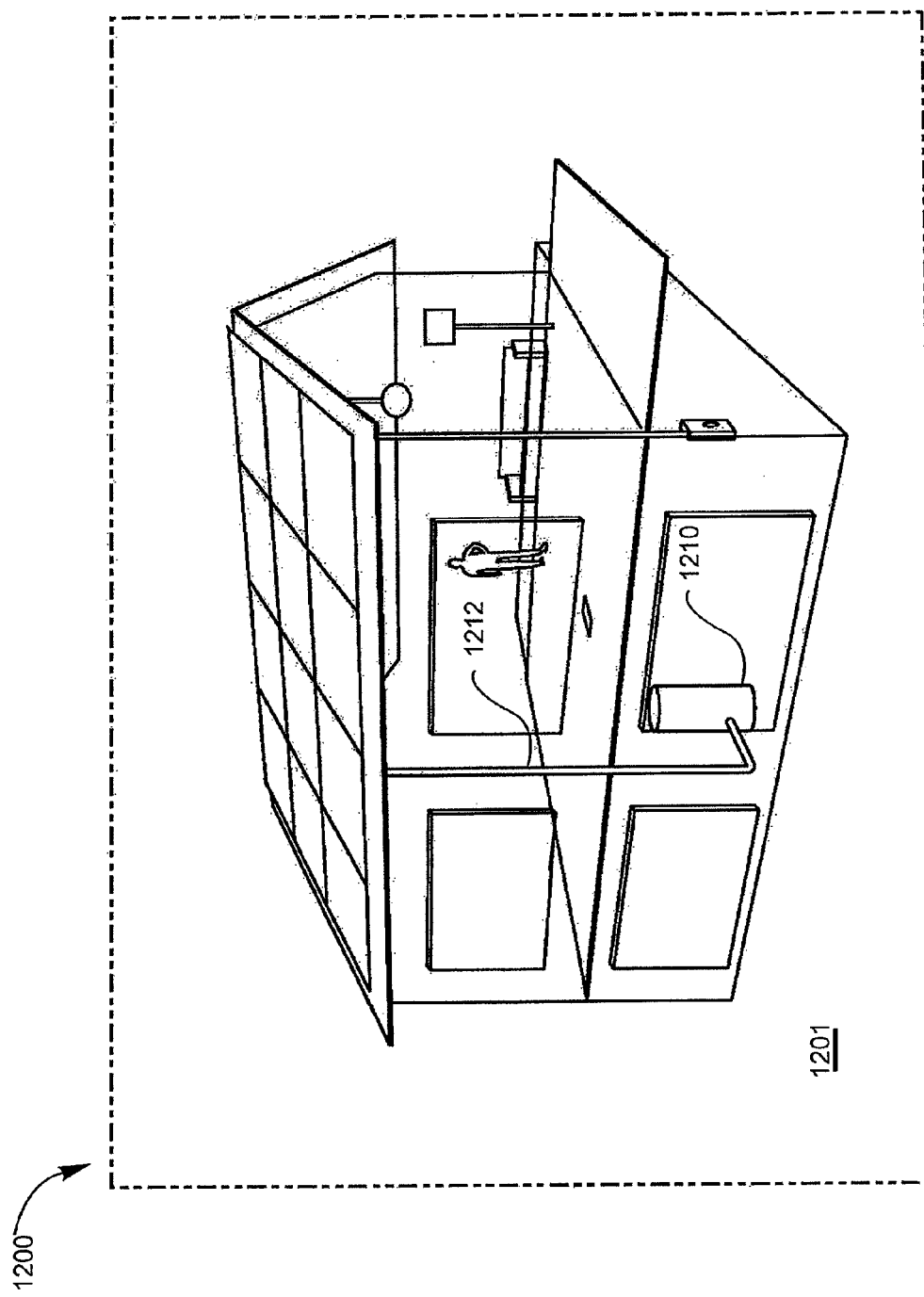
FIGS. 12A through 12C are simplified diagrams illustrating animation of a water heater for a healthy home according to an embodiment of the present invention.
Figure 12B:
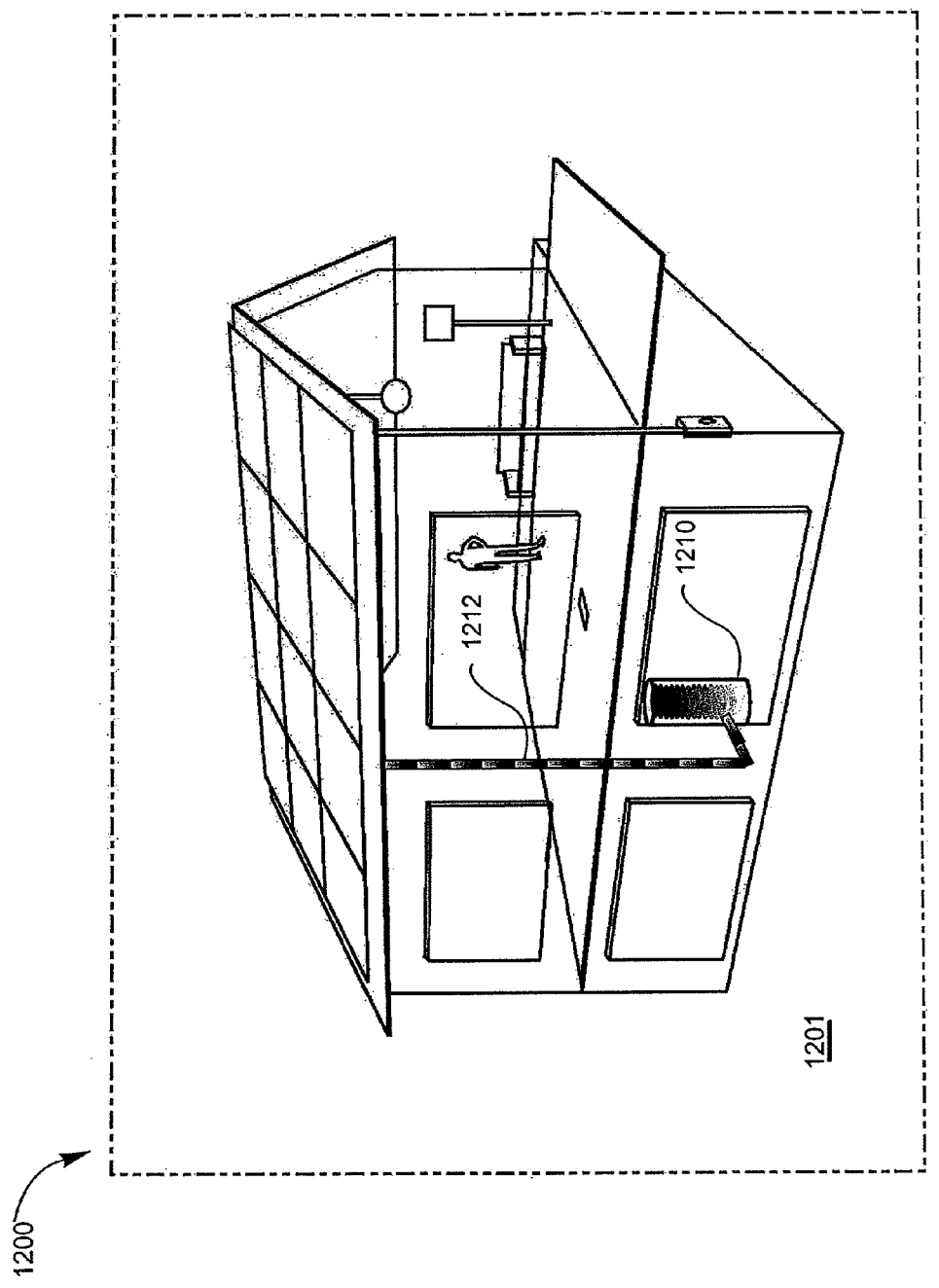
Figure 12C:
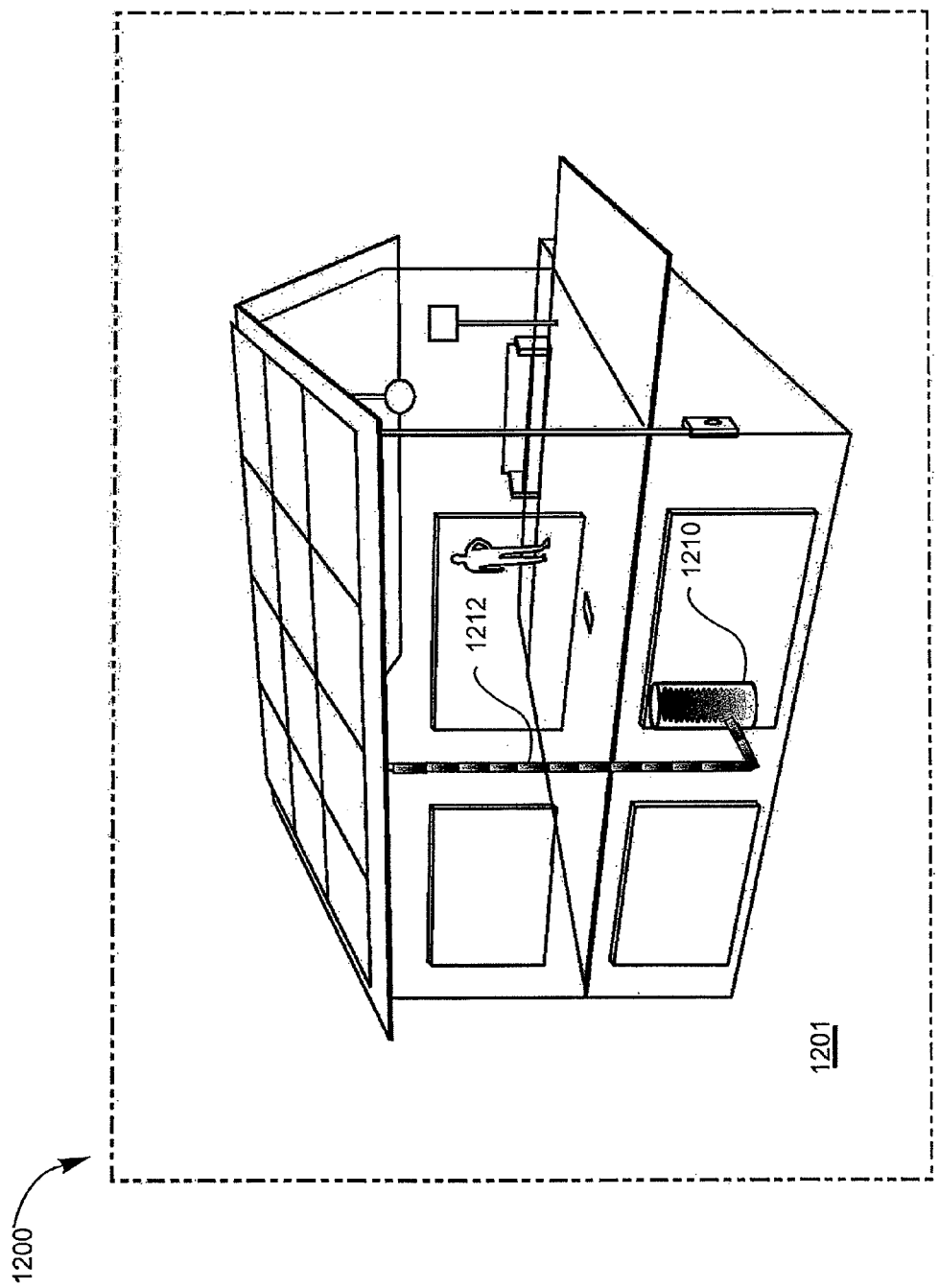

FIGS. 12A through 12C are simplified diagrams illustrating animation of a water heater for a healthy home according to an embodiment of the present invention. These diagrams are merely examples, which should not unduly limit the scope of the claims herein. One of ordinary skill in the art would recognize other variations, modifications, and alternatives. As shown in FIG. 12A, a graphical illustration 1200 includes a water heater 1210 and a water conduit 1212 implemented at a target location 1201. The graphical illustration 1200 of a healthy home system implemented at a target location 1201 shows the disabled status animation of the water heater according to an embodiment of the present invention. In a specific embodiment, the graphical illustration 1200 displays the disabled status of the water heater 1210 by means of a lack of animation from the water heater region 1212 of the illustration 1200. The disabled status of the water heater 1210 can represent the off-state of the heater 1210 in the case of a shutdown procedure initiated from the menu system, of the graphical user interface according to an embodiment of the present invention. In another embodiment, the disabled status of the water heater 1210 can represent the software detection failure, or hardware detection failure, which can include associated warning notices displayed in the user interface. Once again, one skilled in the art can recognize many other variations, modifications, and alternatives.

According to FIGS. 12B and 12C, the graphical illustration 1200 of a healthy home system implemented at the target location 1201 shows the activated status animation of the water heater 1210 according to an embodiment of the present invention. The activated status of the water heater 1210 can represent the on-state of the heater 1210 in the case of proper operation of the healthy home electrical system. In another embodiment, the activated status of the water heater 1210 can represent the on-state in the case of an initialization procedure initiated from the menu system of the graphical user interface according to an embodiment of the present invention. In an embodiment, FIGS. 10B and 10C can represent different phases of the animation of the water heater 1210 for the healthy home. The animation of the water heater 1210 and the water conduit 1212 can include a variety of effects including a "marching ants" effect, moving line segments, color and gradient effects, moving graphical components, as well as others. Again, there can be many other variations, modifications, and alternatives.

Figure 13:
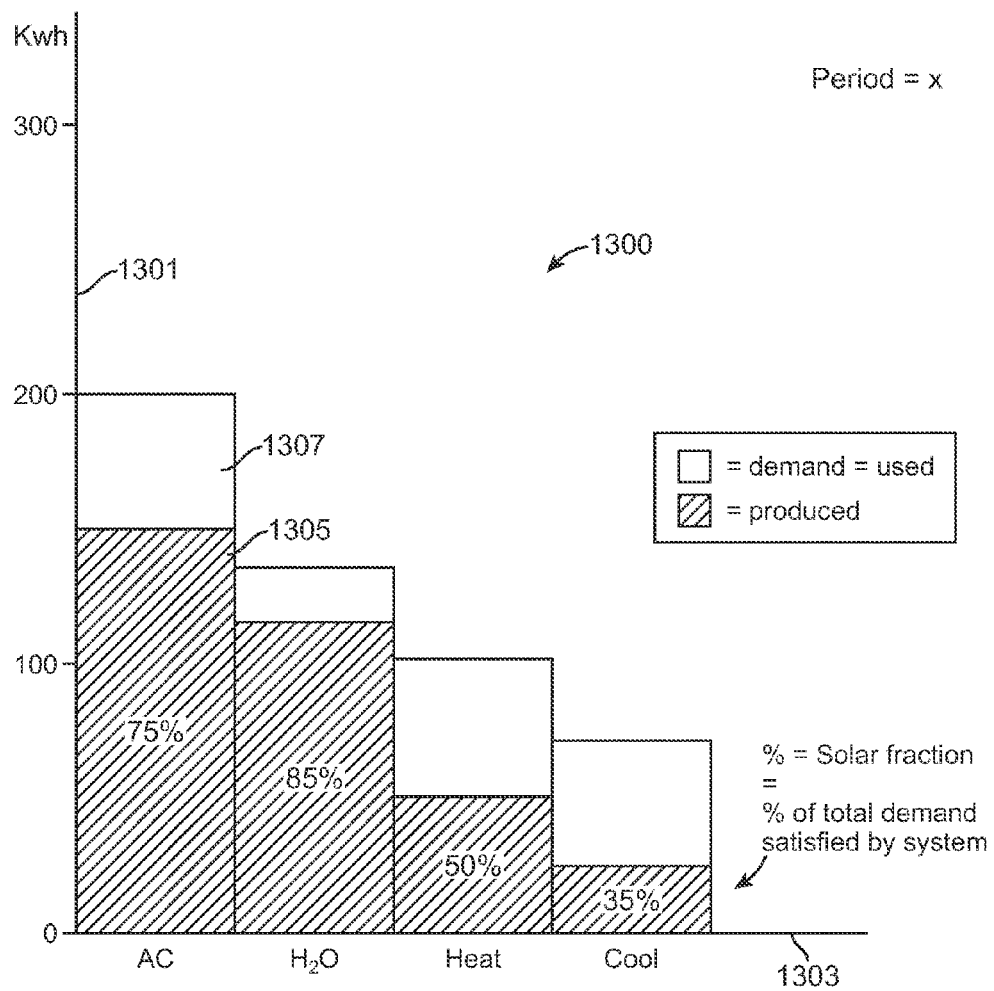
FIGS. 13, 14, and 15 are simplified user interface illustrations according to one or more embodiments of the present invention.
Figure 14:
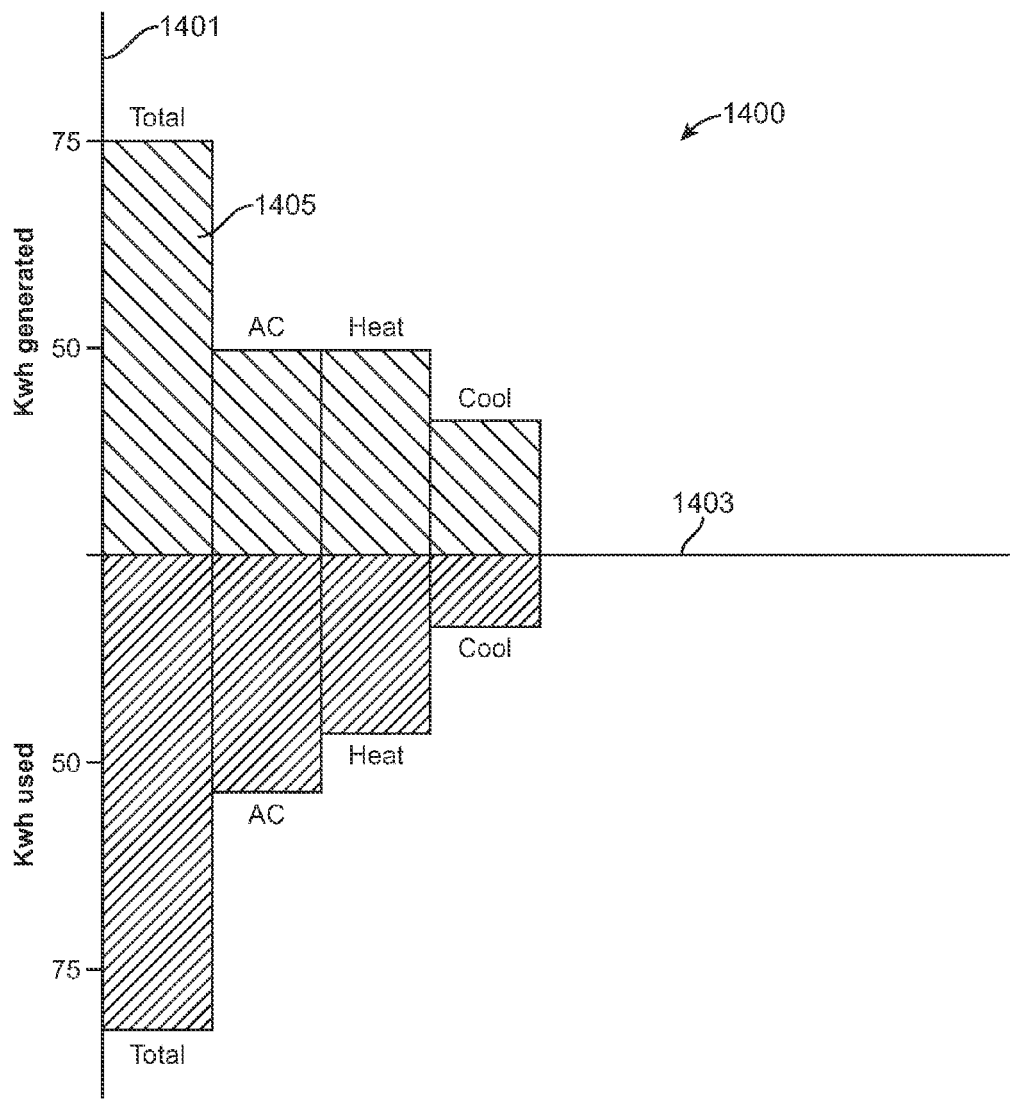
Figure 15:
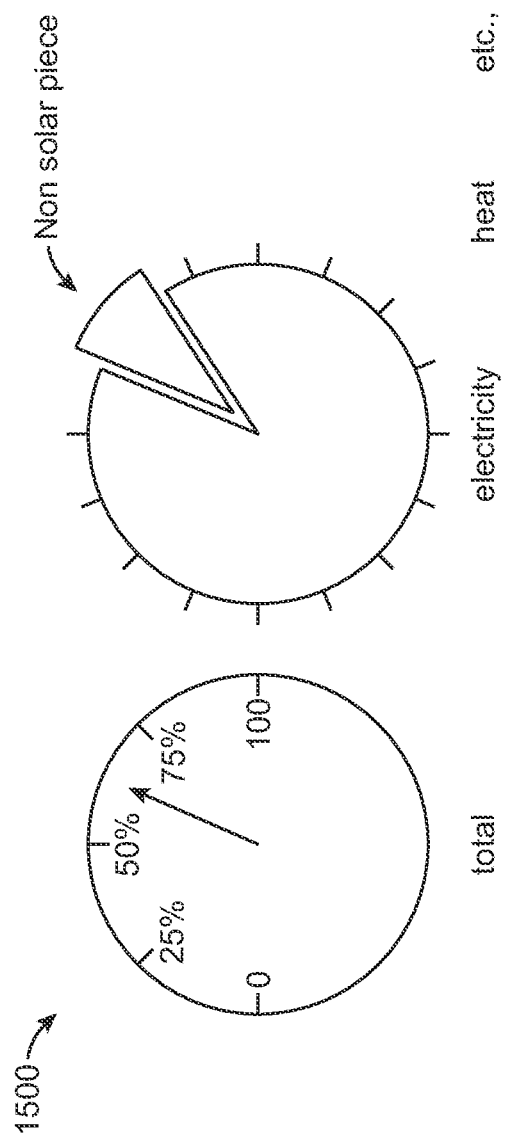

FIGS. 13, 14, and 15 are simplified user interface illustrations according to one or more embodiments of the present invention. These diagrams are merely examples, which should not unduly limit the scope of the claims herein. One of ordinary skill in the art would recognize other variations, modifications, and alternatives. As shown, the user interface includes a vertical axis 1301, which can correspond to an energy unit, and a horizontal axis 1303, which corresponds to a plurality of graphic al objects indicative, respectively, of loads, e.g., AC, Water, Heat, Cooling, according to one or more embodiments. In a specific embodiment, each of the graphical objects is configured as a bar representation. Each bar representation includes a solar energy fraction 1305 and a total demand 1307 for the load according to a specific embodiment. In a specific embodiment, each of the loads is arranged in order of usage or another logical configuration. As shown, the energy unit can be in kilowatt hours, therms, BTUs, carbon units, or others, which are described herein as well as outside of the specification. Of course, there can be other variations, modifications, and alternatives.

Referring now to FIG. 14, the present user interface includes a plurality of graphical objects representative of energy generated and a plurality of graphic objections representative of energy used. As shown, the vertical axis 1401 represents an upper portion of energy generated and a lower portion of energy used. In a specific embodiment, the horizontal axis represents a plurality of loads, including total, AC, Heat, Cool, and others. Of course, there can be other variations, modifications, and alternatives.

Referring to FIG. 15, the present user interface includes a plurality of graphical objects 1500 representative of an energy score, e.g., energy independence, solar sufficient, self reliant. In one or more embodiments, each of the objects is a gauge that includes percentage markings, or others like functional indications. In one or more embodiments, the graphical objects are output on a display or other hardware devices. Of course, there can be other variations, modifications, and alternatives.

As an example, we have provided an example of a residential (or commercial) building structure using one or more aspects of the present method and system. The building structure is generally a complex system with net energy inflows from external sources (electric grid) and local generation flowing into (or out) the building. An equal amount of energy is consumed in the building by various loads to enable building operation. However, the complexity of the flows combined with the disparate nature of the sources and multiple units of measure prevent users (consumers) from obtaining a complete picture of building energy use and/or production. Accordingly, we have discovered that it is often difficult to fully determine a complete picture of an energy processes in the building structure.

Figure 16:
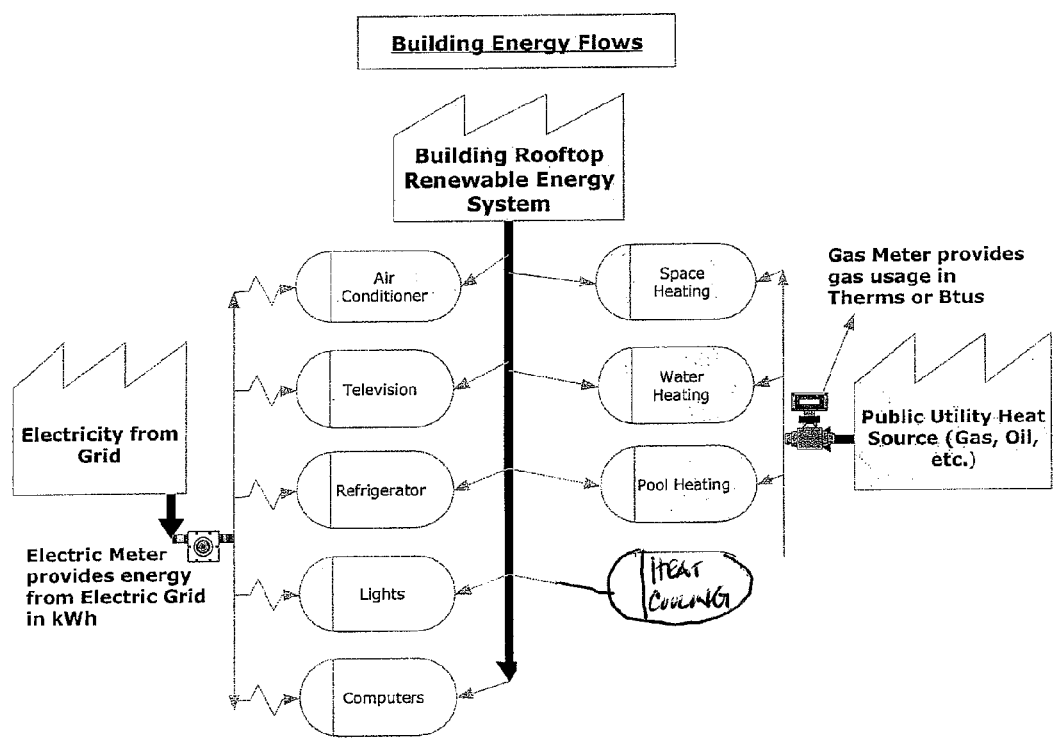
FIG. 16 is a simplified diagram illustrating a system of multiple loads and energy sources according to one or more embodiments of the present invention.

FIG. 16 is a simplified diagram illustrating a system of multiple loads and energy sources according to one or more embodiments of the present invention. The system shown in FIG. 16 can be an example of a residential (or commercial) building structure using one or more aspects of the present method and system. This diagram is merely example, which should not unduly limit the scope of the claims herein. One of ordinary skill in the art would recognize other variations, modifications, and alternatives.

In a specific embodiment, the present method and system provides a building user a single interface device that accurately outputs all energy flows into a common, easy to understand unit of measurement such as kWh (kilo Watt-hours). It accumulates the energy inflow from various sources such as building electric usage (expressed in kWh), natural gas usage (expressed in therms), heating oil usage (tracked in gallons), generation of electric power from PV, and thermal generation from the present thermal solar system into a common unit of energy like kWh. See, for example, FIG. 13. It accomplishes this by operating a measurement and calculation engine that uses various conversion factors, computer aided methods and systems for efficiency measurements. The user interface devices includes a graphical user interface, commonly called a GUI, to provide consumers with insight and ability to better management building energy use by expressing various loads like heating, air conditioning, TVs, computers, water heating, again, in a common unit like kWh. Further details of the present method and device are provided throughout the present specification and more particularly below.

EXAMPLES

Some of the Common Energy Units for consideration include kWh at site, Cost of Energy in $$, Source Energy in kJ, Carbon Footprint in Tons of $CO_2$, and TDV Energy for California. These conversion factors may be updated with time as new utility tariff rates take effect and additional research provides better conversion metrics for Source Energy, Carbon Footprint and Time Dependent Valuation (TDV) of energy usage. Of course, there can be other variations, modifications, and alternatives.

As an example, the electrical energy delivered to a building (or site) is measured in kilowatt-hours and so is the electrical energy usage of building appliances such as televisions, refrigerators, computers and air conditioners which operate using electricity. However, heating appliances such as home furnaces and water heaters that operate using fuels such as gas, propane or oil, measure their heat production in Therms and the incoming source is measured in Btus for gas, or gallons if using propane or oil. This means that these fuels have to be converted into kWh. In addition, energy generation from the a rooftop energy system comprises both electrical energy and thermal energy. Electrical Energy can be measured using current and voltage sensors to derive the electrical usage in kWh. The thermal energy is normally measured in Btus/hr, but can be easily measured in kJ using the SI system of measurement. Again, there can be other variations, modifications, and alternatives.

However, to measure the displaced energy, the procedure is more complicated as it depends on the heating appliances that the rooftop energy system displaces. We will address the water heater and the space heating system, the prime producers of heat in the home. Water heaters differ in their efficiency based on their design. As a general rule, the energy displaced by the rooftop energy system for water heaters can be expressed as:

$$\text{Energy Displaced} = \text{Mass of hot water produced} \times \frac{\text{Water Temperature rise from mains temperature}}{\text{Efficiency of Water Heater}}$$

Here, the mass of hot water and the water temperature rise refer to the portion of water heating addressed by the rooftop energy system. The efficiency of the water heater will typically vary between 0.5 and 1.0 based on the heat source. An instantaneous electric water heater will have an efficiency close to 1.0 while a gas water heater with storage will have an efficiency closer to 0.6. The Energy displaced can be measured in kJ, or Btus based on the units being used.

Similarly, the energy for space heating by the Rooftop Energy System can calculated with a similar equation.

$$\text{Energy Displaced} = \text{Mass of hot water produced} \times \frac{\text{Water Temperature rise from mains temperature}}{\text{Efficiency of Water Heater}}$$

The space heater efficiency can vary between 0.6 and 4.0 based on the type and outdoor temperature. A gas fired space heater usually has an efficiency of greater than 90%, oil fired systems have efficiencies around 60%, space heating with electrical heat provides efficiencies close to 95% and for space heating with heat pump efficiency can be as high as 4.0 based on the outdoor temperature.

The energy displaced is again measured in Btus or KJ and can be converted into a common unit.

1. Site Usage in KiloWatthours:

To finally consolidate all measures in kWh, the following conversion factors are used:

$$1 Therm = 29.31 \text{ KiloWattHours}$$

$$1 KJ = \left(\frac{1}{3600}\right) \text{kiloWattHours} = 0.002778 \text{ kiloWattHours}$$

$$1 \text{ Btu} = 0.0002931 \text{ kiloWattHours}$$

2. Cost of Energy in $:

The energy cost provides the easiest frame of reference for evaluating the various sources of energy on the same plane. It also provides site owners direct feedback on the financial health of their investment in site generation. The cost of energy can be calculated by converting the energy cost from different sources into a common unit. The net cost over a period of n hours (month=720, year=8760) can be expressed in $ as:

$$\text{Total Cost of Energy in \$} = \sum_{Hour=1}^{Hour=N} (\text{Cost of Electrical Energy (in \$/kWH)}) \times \text{Electrical Energy Usuage in kWH} + \text{Cost of Natural Gas (in \$/}Therm) \times \text{Natural Gas Usage in }Therms + \text{Cost of Heating Oil (in \$/Gallons)} \times \text{Number of gallons of heating oil used}$$

3. Source Energy in Kilojoules:

The source energy refers to the actual amount of energy contained in the source fuel used to provide the energy at the site. The source energy serves to normalize electricity usage with other fuel sources such as gas for heating. It refers the site electricity usage back to the amount of energy in the fuel (natural gas, coal, oil) used to generate the electricity. It is a function of the time of use, and the electric utility, but it provides an even playground for comparison of resource usage. To calculate source energy displacement for the Rooftop Energy System it is calculated as $$\text{Annual Source Energy for } RES = \sum_{n=1}^{8760} (\text{Energy displaced at the } GasMeter + \text{Energy displaced at the Electric Meter} \times \text{Source Energy Conversion Factor for Electricity})$$

On an average, source energy for electricity is 3 times that of site electrical energy usage, while source energy for natural gas is the site gas usage as registered by the gas meter. The hourly conversion factor can be obtained from a source like the utility, the Public Utility Commission or third party entities.

4. TDV Energy:

Similar to source energy, the state of California has instituted a metric called the Time Dependent Valuation (TDV) that provides a perceived value to each kWh of electricity used at a site based on generation sources, and transmission and distribution constraints. The TDV metric provides a real value to each unit of energy used. The TDV energy displaced can be calculated as:

$$\text{Annual } TDV \text{ Energy for } RES = \sum_{Hour=1}^{8760} (\text{Energy displaced at the } GasMeter \times$$

Hourly $TDV$ Value for Gas + Energy displaced at the

ELectric Meter × Hourly $TDV$ Factor for Electricity)

5. Carbon Footprint:

Carbon footprint is a function of the fuels used to produce energy. Renewable Energy Systems have a zero carbon footprint while nuclear generation has a very low carbon footprint. Energy generation from cleaner fuels such as natural gas will have a lower carbon footprint while fuels like coal, oil and diesel have the highest carbon footprint. So, the RES has zero carbon footprint, but it displaces energy sources that have a non-zero carbon footprint. To get an accurate measure of the displacement, the hourly energy production from the RES has to be utilized to calculate an annual carbon footprint reduction. This can be calculated in a simplistic manner as shown below:

$$\text{Annual Carbon } Footpring \text{ Reduction using } RES = \sum_{Hour=1}^{8760} (\text{Energy displaced at the } GasMeter \times \text{Carbon footprint of gas}$$

combustion+ Energy displaced at the ELectric Meter × Average carbon footprint for electric utility generation at that hour)

The average electric utility carbon footprint can again be obtained from the electric utility, which would calculate it based on the generation resources operating/allocated at that particular hour. Of course, there can be other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims. As an example, the embodiments above have been applied to a thermal solar system, but any solar system and/or combinations and the like can be used. Additionally, the present method and user interface can be included in other energy systems with or without the use of solar energy or the like. Of course, there can be other variations, modifications, and alternatives. Further details of a specific technique for monitoring and verifying a solar thermal system can be found throughout the present specification and more particularly below.

What is claimed is:

1. A method for displaying energy usage from multiple loads and different sources, the method comprising:
   receiving first load information from a first load in a first unit, the first load being one of a plurality of thermal loads associated with a home and configured to use thermal energy having a first renewable energy source fraction produced specifically for the home;
   receiving second load information from a second load in a second unit, the second load being one of a plurality of electrical loads associated with the home and configured to use electrical energy having a second renewable energy source fraction produced specifically for the home;
   processing the first load information and the second load information into a common unit measure;
   running a diagnostic system check on a plurality of hardware associated with the first load and the second load;
   validating at least one of the first load information and the second load information;
   outputting a first graphical indication of energy usage including the first renewable energy source fraction of thermal energy used by the first load in the common unit; and
   outputting a second graphical indication of energy usage including the second renewable energy source fraction of electrical energy used by the second load in the common unit.

2. The method of claim 1 further comprising outputting a total graphical indication of energy usage comprising at least energy usage from the first load the and second load.

3. The method of claim 1 wherein the first unit is different from the second unit.

4. The method of claim 1 wherein the first unit comprises a therm.

5. The method of claim 1 wherein the second unit comprises kilowatt-hour.

6. The method of claim 1 wherein the common unit of measure is selected from dollar value, kilowatthours, therms, carbon foot print, source energy, or TDV energy.

7. A user display comprising:
   a hardware housing;
   a single interface display device coupled to the hardware housing and one or more connections to a building renewable energy system;
   a plurality of graphical objects displayed on the single interface display device corresponding respectively to a plurality of different loads, the plurality of different loads including at least one thermal load configured to use both a renewable energy portion produced directly from the building renewable energy system and a portion imported from a public utility, wherein the plurality of graphical objects are displayed upon running a diagnostic system check on a plurality of hardware associated with the plurality of different loads and validating at least one of the plurality of different loads;
   wherein each of the graphical objects is displayed in a common unit of measurement;
   wherein each of the graphical objects comprises a total demand portion and a fraction of renewable energy portions at corresponding one of the plurality of different loads; and
   wherein each of the graphical objects are updated and displayed according to a specified scheduling scheme.

8. The user display of claim 7 wherein one of the plurality of different loads is selected from air conditioning, water heating, space heating, space cooling, or others.

9. The user display of claim 7 wherein
each of the plurality of graphical objects is a bar display, a pie display, or a line display.

10. The user display of claim 7 wherein the building renewable energy system comprises at least a thermal solar array for producing thermal energy.

11. The user display of claim 7 wherein the building renewable energy system comprises at least a photovoltaic solar array for producing both electrical energy and thermal energy.

12. The user display of claim 7 wherein the common unit is selected from a percentage ranging from zero to one hundred, a kilowatt hour, a dimensionless score, or an energy unit.

13. A method for outputting energy information in a common unit in graphical form on one or more display devices, the method comprising:
- determining, at a controller, at least one thermal load from a plurality of loads provided in a home or building structure, the at least one thermal load being associated with a thermal load metric measured in a unit consisting of therms;
- determining, at the controller, an energy production including thermal energy in the unit consisting of therms from a renewable energy source being used at the at least one thermal load, the renewable energy source being disposed specifically for the home or building structure;
- running a diagnostic system check at the controller on a plurality of hardware associated with the at least one thermal load;
- validating at least one of the at least one thermal load metrics; and
- outputting at least one graphical object on a portion of the display.

14. The method of claim 13, further comprising:
outputting the at least one graphical object on a portion of the display wherein the at least one graphical object is at least one of:
- a first graphical object illustrating a total energy use of the thermal load on a first portion of the display;
- a second graphical object illustrating a renewable energy source portion of the total energy use of the thermal load on a second portion of the display; and
- a third graphical object illustrating a public utility source portion of the total energy use of the thermal load on a third portion of the display.

15. The method of claim 13 further comprising:
updating the at least one graphical object according to a specified scheduling scheme.

16. The method of claim 13 further comprising:
displaying the at least one graphical object according to a specified scheduling scheme.

17. The method of claim 13 wherein determining the at least one thermal load further comprises:
using one or more sensor devices coupled to the thermal load associated with the renewable energy production.

18. The method of claim 13 wherein determining the energy production further comprises:
determining a total renewable energy output in a thermal or electrical unit of measure.

19. The method of claim 13 wherein determining the at least one thermal load further comprises:
using one or more sensor devices coupled to the thermal load associated with a public utility source.

20. The method of claim 13 wherein outputting the at least one graphical object further comprises:
outputting the at least one graphical object sequentially in one or more orders.

21. The method of claim 13 wherein outputting the at least one graphical object further comprises:
outputting the at least one graphical object using time averaging.

22. The method of claim 13 wherein outputting the at least one graphical object further comprises displaying the at least one graphical object in a unit selected from therms, kilowatt hours, carbon foot print, dollars, and other common units of measure.

* * * * *